(12) United States Patent
Gumaste et al.

(10) Patent No.: US 10,728,139 B2
(45) Date of Patent: Jul. 28, 2020

(54) FLEXIBLE SOFTWARE-DEFINED NETWORKING (SDN) PROTOCOL FOR SERVICE PROVIDER NETWORKS

(71) Applicant: Indian Institute of Technology, Bombay, Mumbai (IN)

(72) Inventors: Ashwin Gumaste, Mumbai (IN); Aniruddha Kushwaha, Mumbai (IN); Sidharth Sharma, Mumbai (IN); Mahesh Jagtap, Delhi (IN)

(73) Assignees: Indian Institute of Technology, Bombay, Mumbai (IN); Defence Research & Development Organisation, New Delhi (IN)

( * ) Notice: Subject to any disclaimer, the term of this patent is extended or adjusted under 35 U.S.C. 154(b) by 0 days.

(21) Appl. No.: 16/143,072

(22) Filed: Sep. 26, 2018

(65) Prior Publication Data

US 2019/0319876 A1    Oct. 17, 2019

(30) Foreign Application Priority Data

Apr. 17, 2018  (IN) .............................. 201821014626

(51) Int. Cl.
*H04L 12/703*   (2013.01)
*H04L 12/24*    (2006.01)
*H04L 12/26*    (2006.01)
*H04L 12/721*   (2013.01)

(52) U.S. Cl.
CPC .......... *H04L 45/28* (2013.01); *H04L 41/0668* (2013.01); *H04L 43/045* (2013.01); *H04L 45/72* (2013.01)

(58) Field of Classification Search
CPC ... H04L 45/28; H04L 41/0668; H04L 43/045; H04L 45/72; H04L 43/08
See application file for complete search history.

(56) References Cited

U.S. PATENT DOCUMENTS

| | | | |
|---|---|---|---|
| 6,480,785 B1* | 11/2002 | Joerg | G01C 21/3446 340/990 |
| 10,257,033 B2* | 4/2019 | Shimamura | H04L 41/5045 |
| 2009/0303882 A1* | 12/2009 | Tanaka | H04L 12/4641 370/237 |
| 2009/0316628 A1* | 12/2009 | Enns | H04L 12/40006 370/328 |
| 2013/0094447 A1* | 4/2013 | Gidlund | H04W 88/16 370/328 |
| 2014/0369209 A1* | 12/2014 | Khurshid | H04L 41/0866 370/250 |
| 2015/0237171 A1* | 8/2015 | Li | H04L 67/16 709/217 |
| 2016/0248672 A1* | 8/2016 | Kurita | H04W 72/0446 |
| 2016/0261495 A1* | 9/2016 | Xia | H04L 45/58 |
| 2017/0250869 A1* | 8/2017 | Voellmy | H04L 41/0893 |
| 2018/0091473 A1* | 3/2018 | Wijnands | H04L 65/4076 |

(Continued)

*Primary Examiner* — Hoang-Chuong Q Vu
(74) *Attorney, Agent, or Firm* — Laxman Sahasrabuddhe

(57) ABSTRACT

Methods and apparatuses for building a programmable dataplane are described. Specifically, the programmable dataplane can work on a list of identifiers, such as those part of OpenFlow 1.5. Specifically, the programmable dataplane can be built by creating a virtual network graph at a controller node using binary identifiers such that a node is broken into an n-ary tree and the tree has 1×2 or 1×1 nodes.

15 Claims, 22 Drawing Sheets

(56) References Cited

U.S. PATENT DOCUMENTS

| | | | |
|---|---|---|---|
| 2018/0144279 A1* | 5/2018 | Yao | G06Q 10/06313 |
| 2018/0287934 A1* | 10/2018 | Wang | H04L 12/4633 |
| 2018/0309664 A1* | 10/2018 | Balasubramanian | H04L 45/38 |
| 2020/0014594 A1* | 1/2020 | Lapiotis | G06F 9/445 |

* cited by examiner

| Key | Offset | Length | Instruction | Flags | Mask | Counter |
|---|---|---|---|---|---|---|

| Action | Type | Value |
|---|---|---|
| Add Label | Label Ethertype | Label value |
| Swap Label | | New Label |
| Add Bitstream | Bitstream Ethertype | Bitstream snippet |

FIG. 4

FLEXIBLE SOFTWARE-DEFINED NETWORKING (SDN) PROTOCOL FOR SERVICE PROVIDER NETWORKS

RELATED APPLICATION

This application claims priority to Indian Patent Application No. 201821014626, having the same title and inventors, which was filed on 17 Apr. 2018, the contents of which are herein incorporated by reference in their entirety for all purposes.

BACKGROUND

Technical Field

This disclosure relates to computer networks. More specifically, this disclosure relates to flexible SDN protocol for service provider networks.

Related Art

Software-defined networking (SDN) technology facilitates network management flexibility, by separating the management of a control plane of network devices from an underlying data plane that forwards network traffic. Such separation of control functions and forward functions enables the SDN network policy to be directly programmable. SDN offers a centralized and programmable network that is capable of meeting the dynamic needs of clients in the network. Furthermore, service provider concerns over ever-increasing CapEx and OpEx in a frequent bandwidth-multiplying Internet economy combined with near-flat revenues has led to a broad consensus around the growth of SDN, (see e.g., B. Naudts, et al. "Techno-economic analysis of software defined networking as architecture for the virtualization of a mobile network," In Proc. European Workshop on Software Defined Networking (EWSDN), October 2012). SDN has the potential to do away with complex specialized network equipment and replace these with centrally programmable "whiteboxes" (see e.g., B. Nunes, et al. "A survey of software-defined networking: Past, present, and future of programmable networks," IEEE Commun. Srvys. & Tuts., Vol. 16, No. 3, pp. 1617-1634, 2014). Most of SDN deployments so far have been in enterprise-class networks, in campuses and within data-center premises. For example, see (1) S. Jain, et al. "B4: Experience with a globally-deployed software defined WAN," ACM SIGCOMM Computer Communication Review, Vol. 43, No. 4, pp. 3-14, 2013, (2) ONF, "SDN in the Campus Environment," [Online]: https://www.opennetworking.org/images/stories/downloads/sdn-resources/solution-briefs/sb-enterprise-campus.pdf, and (3) A. Singh, et al. "Jupiter rising: A decade of clos topologies and centralized control in Google's datacenter network," ACM SIGCOMM Computer Communication Review, Vol. 45, No. 4, pp. 183-197, 2015.

Providers are reluctant to large-scale SDN deployment due to unavailability of carrier-class large whiteboxes. An SDN whitebox can potentially justify the investment on account of plausible savings vis-à-vis contemporary non-agile network equipment (see e.g., A. Gumaste, S. Sharma, T. Das and A. Kushwaha, "How Much NFV Should a Provider Adopt?," IEEE/OSA Journal of Lightwave Technology, Vol. 35, No. 13, pp 2598-2611, 2017). One approach towards an SDN network is to use current network gear and make it compatible with an SDN controller. Another approach is to inculcate a whitebox based solution, see e.g., AT&T, "AT&T Vision Alignment Challenge Technology Survey," White Paper (2013).

Among others, there are two obstacles that can impact next generation SDN deployment: (1) The SDN protocol of choice (OF, see e.g., N. McKeown, et al., "OpenFlow: Enabling Innovation in Campus Networks," ACM SIG-COMM Computer Communication Review, Vol. 38, No. 2, pp 69-74, 2008) is rather rigid. While OF can be programmed to just about any user-oriented application, it eventually functions on 40-odd protocol identifiers in its controller's south bound interface (SBI), which means that any new protocol that the hardware has to support has to be first routed through a standardization exercise before making into a provider's network. (2) Many vendors have developed their own controller—one that provides a programmable north bound interface (NBI), (see e.g., Ciena Blue Planet and Juniper Contrail), but severely restricts the south bound interface (SBI) to a vendor-specific forwarding plane.

Providers' desire the full Operations, Administration, Management and Provisioning (OAM&P) features. The introduction of SDN would imply that SDN technologies adhere to the OAM&P service requirements. Current discussions around OAM&P support in SDN are only in the nascent stages and would likely have an impact on assimilation of SDN in provider networks. In particular, providers seek per-service monitoring support and ability to restore service post-a-failure within 50 ms for various kinds of failures as well as end-to-end deterministic delay that facilitates service guarantees and Quality of Experience to the end-user.

Some of the embodiments described herein, overcomes the above mentioned issues by providing a bitstream scheme that is able to provide carrier-class attributes such as 50 ms restoration, per-service handling capability, deterministic delay, building a carrier-class white-box that is capable of performing in provider networks while adhering to SDN concepts, particularly being able to meet a wide spectrum of protocol requirements.

SUMMARY

Embodiments described herein provide a programmable dataplane. Specifically, some embodiments build a programmable dataplane that can work on a list of identifiers, such as those part of OpenFlow 1.5. Some embodiments build a programmable dataplane by creating a virtual network graph at a controller node or nodes using binary identifiers such that a node is broken into an n-ary tree and the tree has 1×2 or 1×1 nodes. Some embodiments include one or more of the following features: (1) service protection, (2) services that are user defined and programmable, (3) provide a source routed scheme that uses labels where each label is a binary graph implementation of a node, (4) provide a source routed scheme that uses labels where each label is a binary graph implementation of a node and the labels are generated by a singular or plurality of controllers and passed onto the ingress node.

Some embodiments feature a hardware implementation that facilitates nodes to forward packets based on at least three predicates: offset, length and instruction. Some embodiments allow for defining any protocol, service or any combination of header space fields to be worked upon. In a variation, an embodiment allows for defining any protocol, service or any combination instructions to be worked upon. In a variation, an embodiment allows for defining any protocol, service or any combination instructions in their plurality to be worked upon. In a variation, an embodiment allows for defining any protocol, service or any combination of header space fields and instructions to be worked upon. In a variation, an embodiment allows for defining any protocol, service or any combination of header space fields and instructions to be worked upon where the header space and instructions are defined by a parse graph. In a variation, an embodiment allows for defining any protocol, service or any combination of header space fields and instructions to be worked upon where the header space and instructions are defined by a partial parse graph. In a variation, an embodiment allows for defining any protocol, service or any combination of header space fields and instructions to be worked upon where the header space and instructions are defined by a limited parse graph.

Some embodiments use binary tags as port vectors for realizing multicast in a singular network. Some embodiments use binary tags as port vectors for realizing multicast in a plural network. Some embodiments provide restoration after a node, a plurality of nodes, a card, a plurality of cards, a port, a plurality of ports or a fiber or a plurality of several fiber connections have gone down due to outage or outages such that the restoration of service is within 50 milliseconds for various protocols defined by the service layer. Some embodiments provide a method for realizing the controller state machine, the bitstream forwarding logic in a programmable gate array device. Some embodiments provide a method for describing the network, the node, the protocol (bitstream) and services over the bitstream framework as an Extensible Markup Language (XML) representation. Some embodiments provide a method to control the network using submodules such network telemetry, service manager and discovery manager and user interface (UI) handler.

During operation, some embodiments can receive a packet at source node in a network, wherein the packet is to be routed from the source node to a destination node in the network. Next, the embodiment can compute a network path from the source node to the destination node in the network. The embodiment can then create a collection of node forwarding graphs based on the network, wherein each node in the network is represented by a set of 1×2 or 1×1 nodes in the collection of node forwarding graphs (each 1×2 node in the collection of node forwarding graphs has a single input port and two output ports, and each 1×1 node in the collection of node forwarding graphs has a single input port and a single output port). Next, the embodiment can determine a bitstream snippet based on the network path and the collection of node forwarding graphs. The packet can then be routed through the network based on the bitstream snippet. Specifically, at each node in the network path, the packet can be forwarded to a next node based on a distinct portion of the bitstream snippet.

In some embodiments, the packet comprises a set of fields including: (1) an offset that indicates a location in the packet for extracting, inserting, or modifying a field, (2) a length of the field that is to be extracted, inserted, or modified, and (3) an instruction that specifies whether the field is to be extracted, inserted, or modified.

In some embodiments, a fault in the network path can be detected, and future packets can be routed through a protection network path that avoids the fault in the network.

In some embodiments, a set of bitstream snippets is provided to the source node in the network. Next, the source node can select a bitstream snippet from the set of bitstream snippets based on the destination node and optionally other factors. Next, the source node can add the bitstream snippet to the packet. The source node can then forward the packet to a next node in the network path based on one or more bits in the bitstream snippet.

Some embodiments provide an apparatus comprising: (1) a processor and (2) a non-transitory storage medium storing instructions that, when executed by the processor, cause the processor to perform a method to determine a bitstream snippet for each source-destination pair in a set of source-destination pairs in a network, the method comprising: computing a network path from a source node in the source-destination pair to a destination node in the source-destination pair; creating a collection of node forwarding graphs based on the network, wherein each node in the network is represented by a set of 1×2 or 1×1 nodes in the collection of node forwarding graphs; and determining a bitstream snippet based on the network path and the collection of node forwarding graphs.

BRIEF DESCRIPTION OF THE FIGURES

FIG. 4 illustrates a match table structure in accordance with some embodiments described herein.

DETAILED DESCRIPTION

Figure 1A:
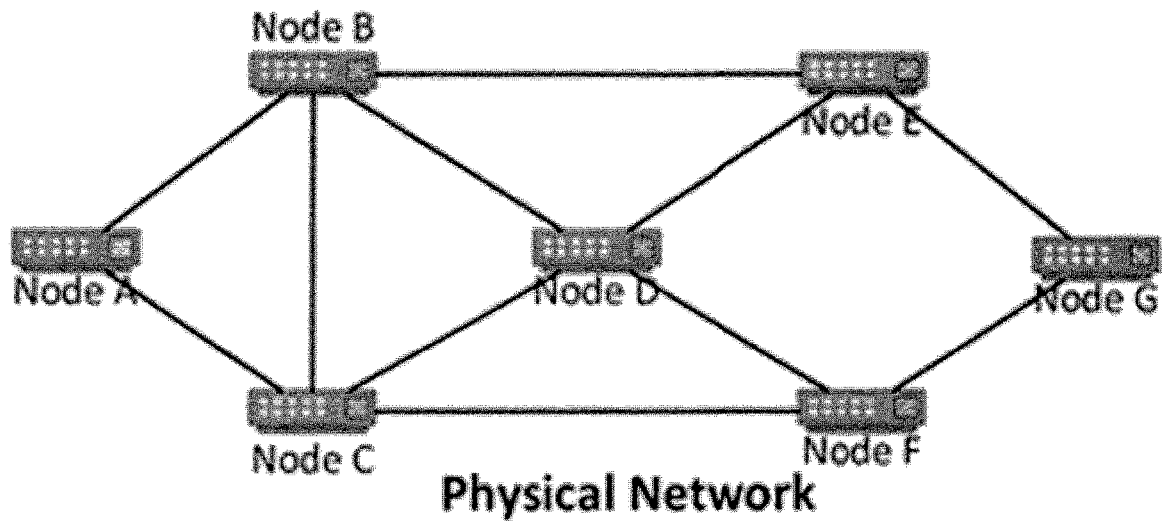
FIG. 1A illustrates a physical network in accordance with some embodiments described herein.

The following description is presented to enable any person skilled in the art to make and use the embodiments described herein, and is provided in the context of a particular application and its requirements. Various modifications to the disclosed embodiments will be readily apparent to those skilled in the art, and the general principles defined herein may be applied to other embodiments and applications without departing from the spirit and scope of the described embodiments. Thus, the described embodiments herein is not limited to the embodiments shown, but is to be accorded the widest scope consistent with the principles and features disclosed herein.

One of the first approaches of data-control plane separation is the ForCES. For example, see (1) "Forwarding and control element separation (ForCES) framework," L. Yang, R. Dantu, T. A. Anderson, and R. Gopal, IETF, Fremont, Calif., USA, RFC 3746, April 2004, and (2) "Forwarding and control element separation (ForCES) protocol specification," A. Doria, et al., IETF, Fremont, Calif., USA, RFC 5810, March 2010. ForCES provides a generic framework for data-plane-control-plane separation. Importantly ForCES defines a logic and forwarding block (LFB) class library that shows how the data-plane can be implemented to facilitate forwarding for specific protocol requests. Some embodiments described herein better partition the data-plane leading to determinism in the network. The described embodiments provide a one-size fits all schema is more open than previous data-control plane separation approaches for protocol support.

OpenFlow (OF) is by far the leader of the controller protocols pack. While OF is extremely flexible with the NBI of a controller, the SBI supports a fixed set of protocol match identifiers. In fact, as compared to OF1.3 and 1.4 the set of match identifiers has been increased in OF1.5. The problem with this approach is that for each new protocol to be added to the SBI of the OF controller, we have to wait for a two-year round of standardization.

Recent examples of VXLAN, (see e.g., "Virtual extensible local area network (VXLAN): A framework for overlaying virtualized layer 2 networks over layer 3 networks", M. Mahalingam, et al., No. RFC 7348, 2014), and NVGRE (see e.g., "NVGRE: Network Virtualization Using Generic Routing Encapsulation", P. Garg and Y. Wang, No. RFC 7637, 2015), are testimonial to this delay. The approaches described herein are protocol-agnostic. We show that any new protocol can readily be added to the bitstream supporting protocol suite. Further such upgrades can be distributed (node-specific) and in situ (without affecting the data-plane traffic). A second advantage of our approach over OF is that our focus is particularly provider-oriented and we build upon the concept of provisioned services. Though OF is restricted in the number of fields that its SBI can process, in a way this is important as it also implies good interoperability with gear from various vendors as well as backward compatibility with already installed gear.

Protocol Oblivious Forwarding (POF) (see e.g., "Protocol-oblivious forwarding: Unleash the power of SDN through a future-proof forwarding plane," Haovu Song, In Proc. ACM SIGCOMM workshop on Hot topics in software defined networking, August 2013) relaxes the specific requirements of SBI data-structures used in OF by proposing a reduced set of actions to be performed on a packet, in addition to an offset value that would define the protocol being worked upon in the packet header. In POF the hardware must be designed to support specific protocol actions, while in some embodiments described herein, the hardware is generic and not protocol-specific. Further, the embodiments described herein, provide a scheme that is more efficient than POF from a delay perspective. Once a packet is encoded with a bitstream at the edge of a network the processing turns out to be much simpler than POF.

In CSRS (see e.g., "CSRS: A Cross Domain Source Routing Scheme for Multi-domain SDNs," W. Zhang, P. Hong, L. Yao, J. Li and D. Ni, IEEE ICC 2015 Workshop on Software Defined and Context Aware Cognitive Networks 2015) is proposed a cross-domain source-routing scheme for multi-domain network routing by combining source-routing with pre-routing. The work is mostly relevant to multi-controller networks, where a controller needs to bear the load that is related to local traffic and hence the use of source routing, which eventually leads to lowering the number of controllers.

In "Tag and Forward: A Source Routing Enabled Data plane for OpenFlow Fat-Tree Networks," IFIP/IEEE $2^{nd}$ Workshop on Analytics for Network and Service Management, A. Ishimori. E. Cequiraa and A. Abelem (Ishimori), source routing is used such that it is similarly deployed to Omnipresent Ethernet (OE), see e.g., "Omnipresent Ethernet—Technology choices for future end-to-end networking,", A. Gumaste, e al., IEEE/OSA Journal of Lightwave Technology, Vol. 28, No. 8, pp 1261-1277, 2010 (Gumaste). Specifically, there is a gate at the ingress point in a network that facilitates tagging. Tagging is introduced by the control plane and tags are stripped off at the egress. The work in Ishimori only supports layer-2/2.5 forwarding and is primarily restricted to data-center networks. Some of the embodiments described herein, is significantly advanced compared to Ishimori, as we consider practical aspects of tagging and show how the scheme works in a real-provider network setting.

In "SDN Based Source Routing for Scalable Service Chaining in Data Centers,", A. Abujoda, H. Kouchaksaraei, and P Papadimitriou, Int'l Conf. on Wired/Wireless Internet Communications, April 2016, the authors propose manipulating OpenFlow to add a source-routing tag that facilitates source-routing within a data-center for up to 256 ports. Multiple such tags can be inserted for scalability. The work is specific to data-centers and focuses only on forwarding, implying that other technologies are needed for achieving full network function. The embodiments described herein, are beyond the realm of data-centers and can be expanded to any protocol (see Table V) and any network topology.

In "Exploring Source Routed Forwarding in SDN-Based WANs", M. Soliman et al., IEEE ICC 2014 Sydney 2014, the authors explore source-routing in WANs and illustrate the concerns with source routing from a protocol overhead perspective. The embodiments described herein, provide an approach of using network forwarding graphs at nodes that alleviates the above-mentioned concern.

Omnipresent Ethernet or OE, (see e.g. (1) Gumaste and (2) "On the Design, Implementation, Analysis, and Prototyping of a 1-µs, Energy-Efficient, Carrier-Class Optical-Ethernet Switch Router", S. Bidkar, IEEE/OSA Journ. of Lightwave Tech. Vol. 32, No. 17, pp 3043-3060, 2014) is purely built using a Carrier Ethernet stack and does not require an SDN controller. Some embodiments described herein, use the carrier-class data plane features of OE while facilitating programmability and opening up the data-plane to a much larger spectrum of protocols. While OE facilitates IP, MAC and port based services, it cannot provision layer 4 and other such services which require processing beyond mere forwarding.

Segment routing, see e.g., C. Filsfils et al., "Segment Routing Architecture," IETF draft-ietf-spring-segment-routing-01, February 2015, is a flexible way of doing source routing where the source node chooses a path and encapsulates the path information in a packet header as a list of segments. A segment is a sub-path along a route between any two nodes. Each segment is associated with a segment identifier. The segment identifiers are distributed to all the nodes present in the network using IGP or its extensions. Segment identifiers could be node identifiers or adjacency identifiers. Node identifiers are associated with a node (router) and are unique throughout the network. Adjacency identifiers are local to a node and represent the interfaces of the node. In some of the embodiments described herein, bitstream uses segment identifiers similar to adjacency identifiers for specifying the source routed path. Unlike segment routing which requires IGP-like-protocols, our approach is completely protocol agnostic. Furthermore, members of a bitstream snippet have spatial meaning (ports), while a segment identifier is a generically allocated number.

Segment routing in conjunction with SDN has been considered in (1) L. Davoli et al., "Traffic engineering with segment routing: SDN-based architectural design and open source implementation," Proc. Eur. Workshop Softw. Defined Netw. (EWSDN '15), pp. 112, 2015 (Davoli), and (2) A. Sgambelluri et al., "Experimental Demonstration of Segment Routing," J. Lightw. Technol., vol. 34, no. 1, pp 205-212. August 2015 (Sgambelluri). The approaches in Davoli and Sgambelluri is to use populate MPLS forwarding tables through a controller. Some of the embodiments described herein, provide an approach that is more advanced as it can support forwarding based on many different identifiers (not just layer 2.5 labels).

BIER, see e.g., (1) Wijnands, I J, et al., "Multicast using Bit Index Explicit Replication," draft-wijnands-bier-architecture-00; Sep. 22, 2014, and (2) N. Kumar et al, "BIER Use Cases," draft-ietf-bier-use-cases-06; Jan. 16, 2018, is a segment routing-based scheme where a unique node identifier is assigned to each node in the network. The ingress node encodes the packet with the BIER header that contains a bitstring. The bitstring has a bit corresponding to all the egress nodes in the network. If the packet is destined to a particular node, the corresponding bit is switched ON in the bitstring by the ingress node. Each node floods their bit-position for prefix mapping using IGP or similar other protocols, which are used to create a bit forwarding table. The bit forwarding table at a node stores the information related to the neighbors of the node. The bitstring header in the packet is matched against the bit forwarding table at each intermediate node along the path to its destination. For any flow, this scheme imposes the requirement of a bit forwarding table in addition to match-tables. Some of the embodiments described herein, provide a solution that neither requires any match at the intermediate nodes nor does it require any additional table. In that sense our approach is more efficient than BIER. A shorter version of this work with limited results and without the software and hardware details or analytical justification is presented in "Bitstream: A Flexible SDN Protocol for Service Provider Networks," A. Kushwaha, S. Sharma, N. Bazard and A. Gumaste, to appear in IEEE Int'l Conf. on Commun. ICC 2018.

Some of the embodiments described herein, propose a solution that removes the limitations on the SBI match-identifier fields, while preserving the programmability in the NBI of the controller. In addition, the conceptual solution called "bitstream" is able to provide carrier-class attributes such as 50 ms restoration, per-service handling capability and deterministic delay. Some embodiments described herein build a carrier-class white-box that is capable of performing in provider networks while adhering to SDN concepts, particularly being able to meet a wide spectrum of protocol requirements. This flexibility in protocol support is important to achieve programmability in the NBI.

The described embodiments provide the white-box that can perform any programmable task using an SDN controller or through a REST API, see e.g., M. Masse, REST API Design Rulebook, O'Reilly, 2012. Any kind of service can be set up using a modeling language such as YANG (see (1) M. Bjorklund, "YANG—A Data Modeling Language for the Network Configuration Protocol (NETCONF)," RFC 6020, October 2010, and (2) R. Enns, M. Bjorklund, J. Schoenwaelder, and A. Bierman, "Network Configuration Protocol (NETCONF)", RFC 6241, June 2011). The novelty of the whitebox is the compliance to the bitstream protocol, which in some sense is a generalization of the OpenFlow protocol. In order for the whitebox to function in a provider domain a custom hardware has been developed that comprises of FPGAs, framer chips and IO ports along with peripheral electronics such as DDR, TCAM memories and processing units. To meet provider requirements in the field, a network management system (NMS) has also been developed that facilitates data collection and event gathering, see e.g., J. Donovan and K. Prabhu, "Building the Network of the Future," CRC Press, 2017, service design features and provisioning aspects as well as serves as a conduit to third-party controllers and potentially opens out to programmers and developers.

The bitstream concept is based on a virtual topology superimposing schema that uses the SDN premise of control and data-plane separation to build a virtual topology that is embedded on a physical topology. Specifically, a controller abstracts each physical node in a network as an auxiliary node forwarding graph (NFG), in which every vertex can be traversed using a single bit. This means that no vertex in the NFG would subtend more than 3 undirected edges. End-to-end paths are now manifested at the controller by conjoining the vertices in the NFGs along the shortest path for each node in the actual topology. The resulting source-routed information is called a bitstream snippet and is stored in MPLS-like labels. The idea is to map all sorts of forwarding protocols (such as IPv4, IPv6, MAC, VLAN, port-based, MPLS, CTAGs/STAGs, etc.) to a homogenous source-routed bitstream snippet (BS).

The described embodiments provide an approach that is not just beneficial from the perspective of simplicity, but also solves two issues of scalability in terms of new protocol adoption as well as carrier-class support. An advantage of the described embodiments herein, is overall reduction in latency. Furthermore, the described embodiments show that for an h-node path, the latency is reduced to approximately 1/(h−1) of the latency as compared to any other forwarding scheme, such as OF, MPLS etc.

Bitstream

A network graph G(V, E) of a set of V vertices and E edges is abstracted to an auxiliary collection of node forwarding graphs NFG($\overline{V}$, $\overline{E}$), where a node in the NFG is denoted by $\{\overline{V}_i\}$ and is a k-dimensional one-hop representation of a source-routed path through the actual node $V_i$ in G. This implies that for each $V_i \in G$, $\exists(\{\overline{V}_i\}: V_a \in \{\overline{V}_i\} \in \{0,1\}$. This implies that a node in the physical topology is represented by a set of 1×2 nodes in the NFG denoting the source-routed path that is to be traversed by the forwarding-plane. Further, $V_a=1$, if the path through $V_a$ has to take a right-turn (from the base of the 1×2 tree rooted at $V_a$), or $V_a=0$, if the path through $V_a$ has to take a left-turn beginning at the base of the 1×2 tree rooted at $V_a$. Note that for every service passing through the same physical node $V_i$, the value of $V_a$ and the set $\{\overline{V}_i\}$ may be unique, i.e., if $V_a$ is stationed in a path, then for an East-to-West service the value of $V_a=1$, i.e., in this case the service needs to pass through $V_a$ and not be dropped at $V_a$. Conversely, if the service is West-to-East, then the value of $V_a$ for that service would be 0. This shows that $V_a$ is direction and service specific. The physical node $V_i$ may have several $V_a$'s as part of its NFG representation, resulting in a bitstream to traverse through, $V_i$. If the degree of $V_i$ (cardinality) is, $D_i$, then for traversing through $V_i$ there can be at the most k=(D−1)! bitstreams in the NFG. However, we allow for k>(D−1)! to account for additional service specific functions which are beyond pure forwarding (such as label-swap, BGP-peering, ACL, etc.).

Figure 1B:
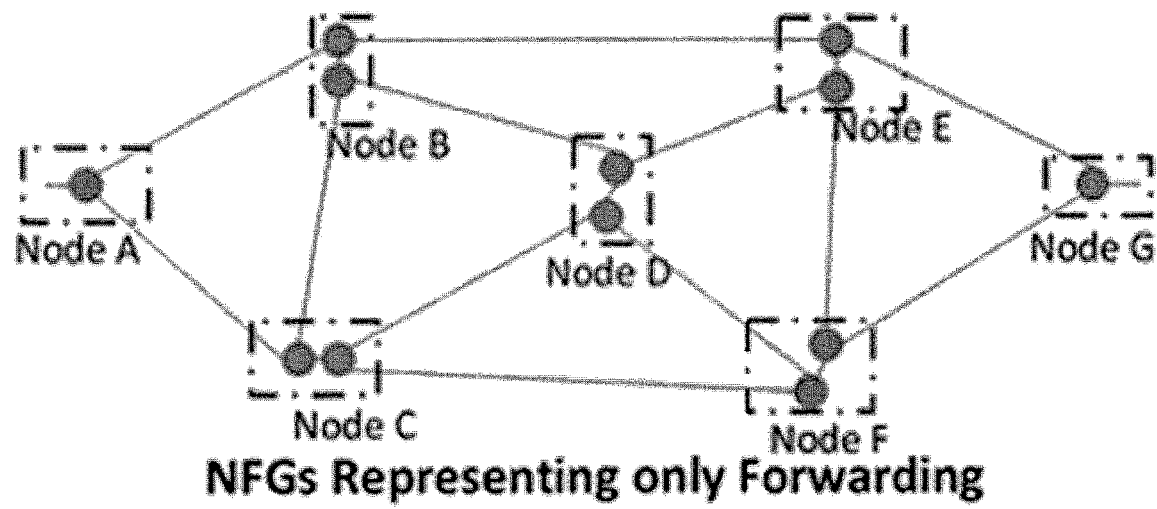
FIG. 1B illustrates a node forwarding graph (NFG) representation of the physical network for only forwarding in accordance with some embodiments described herein.
Figure 1C:
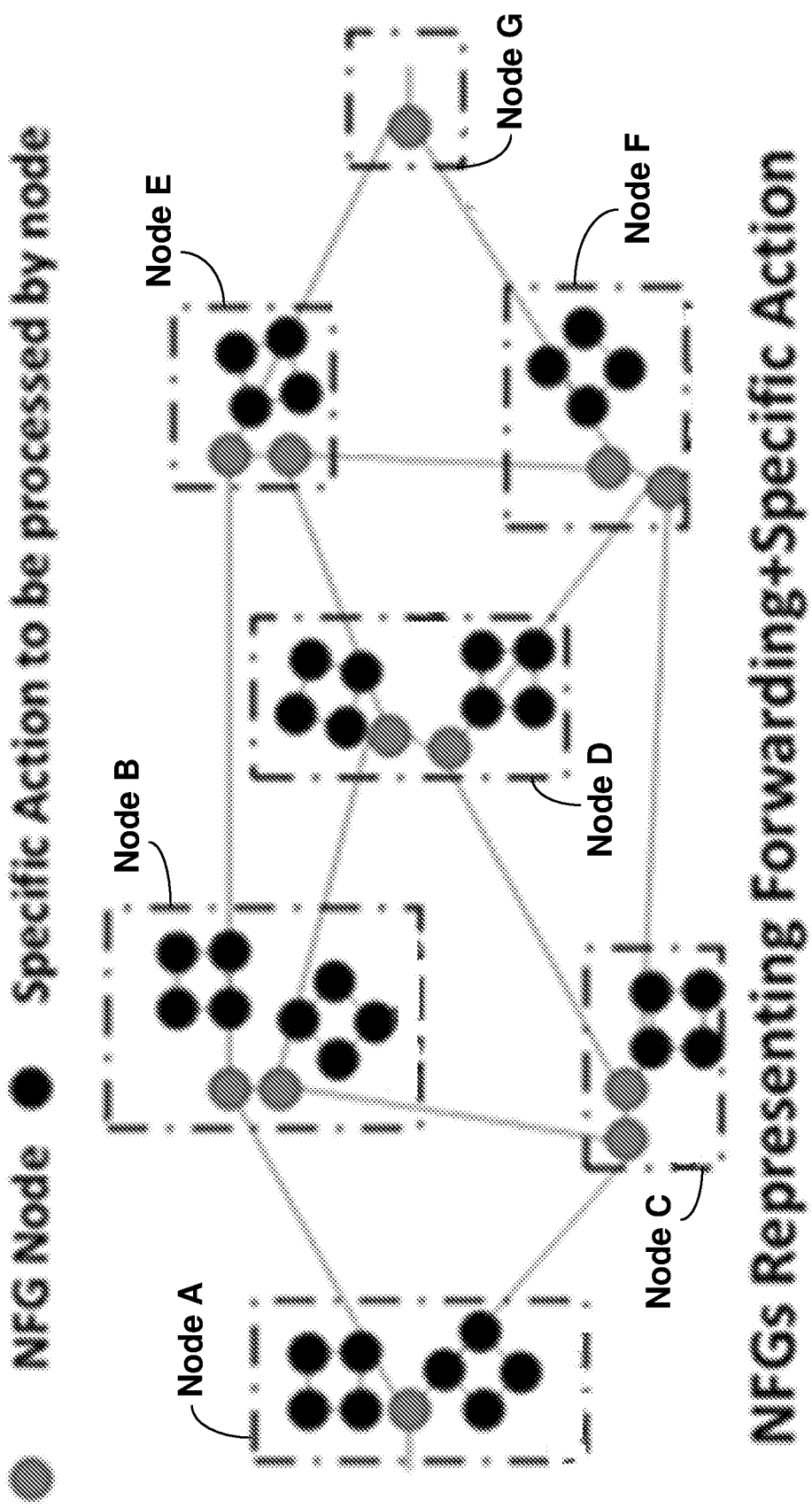
FIG. 1C illustrates an enhanced NFG representation of the physical network with forwarding and specific action implementation at the NFG level in accordance with some embodiments described herein.

FIG. 1A illustrates a physical network in accordance with some embodiments described herein. FIG. 1B illustrates a NFG supporting network for only forwarding in accordance with some embodiments described herein. Specifically, FIG. 1B shows a physical network that is converted into a NFG supporting network for only forwarding. FIG. 1C illustrates an enhanced NFG supporting network with forwarding and specific action implementation at the NFG level in accordance with some embodiments described herein. Specifically, FIG. 1C essentially shows the journey of a packet through forwarding and specific action (the dark-black nodes are used for processing functions such as TTL decrement, packet reordering etc., while the grey nodes are used for only forwarding).

Bitstream Protocol

In the described embodiments, a network that supports bitstream is termed as a closed domain. A closed domain is typically a provider network. The closed domain is governed by one or more controllers. An incoming service is encoded by a "bitstream snippet" (BS) while entering the closed domain. The bitstream snippet for a service is generated as follows:

(1) The controller computes the shortest path that suffices for all the parameters for the service in G.

(2) The controller then creates the NFG equivalent of each node along the path and conjoins each NFG equivalent stream to generate a bitstream snippet (BS). The BS is essentially source-routed information for carrying the packet from ingress to egress. If the service requires actions apart from pure forwarding such as swap, or sorting, then the controller sets few additional bits in the bitstream snippet. For pure forwarding (switching/routing) the BS is enough to carry the packet to the destination.

(3) The controller then creates entries for the table in the parser at the ingress node identifying the service parameter to be measured (such as IPv4, IPv6, TCP port number, or any other combination).

In the described embodiments, two broad service types are defined as follows: (a) Provisioned service: A provisioned service is one in which the controller has created entries in the forwarding table at the ingress node ahead in time and only thereafter can the data flow. For example, L2/L3VPN services and Internet leased-lines both of which together constitute bulk of enterprise traffic; and (b) Impromptu service: An impromptu service is one in which the host sends data without prior intimation of the controller, similar to a host attached to a LAN. In this (typically enterprise) setting, traffic from a host is sent unsolicited to a node (edge of the closed domain). If there is a match between any of the service attributes with an entry in the preconfigured table, the packet is thereafter encoded with the BS, else the packet is either routed to a default port or dropped.

Bitstream Node Architecture

A node in the closed domain is assumed to have SDN forwarding capabilities, specifically by a table that can be configured by a controller through a control state machine (CSM). The CSM resides in the whitebox hardware and interacts with the controller's SBI. The tables in a bitstream capable node is based on the Reconfigurable Match Table [32] principle, see e.g., P. Bosshart, et al., "Forwarding metamorphosis: fast programmable match-action processing in hardware for SDN," ACM SIGCOMM Computer Communication Review, Vol. 43, No. 4, pp 99-110, October 2013. When a packet enters a node, it is classified at a parser as "marked" or "unmarked" based on the Ethertype of the packet. An unmarked packet is one that comes from outside the closed domain and has no BS in it. A marked packet comes from another bitstream supporting node.

For an unmarked packet, the parser sends the packet to a match-table. The match-table may have a match for this packet or may drop the packet or send it to a default port. If a match occurs, then the packet is marked by adding the BS label after the L2 header. This label is of variable length, of which the first 2-bytes constitute a custom Ethertype tag (different tags for unicast and multicast service). The remaining bits constitute the BS and contain a pointer and a set of NFGs.

A node of k-dimensions requires up to $4(\log_2(k)-2)+n$ bits to traverse through it, where $2(\log_2(k)-1)$ bits are needed for nascent forwarding and n additional bits are required for specific service parameters (such as ACL, packet ordering, packet modifications etc.) that the node must process in addition to forwarding (see FIG. 1C). Another $2(\log_2(k)-1)$ are required for traversing through the switch back after specific service actions (not pertaining to forwarding) are performed. The pointer informs a node in G as to where to start counting the $4(\log_2(k)-2)+n$ bits in the BS for forwarding and actions as well as informs how many bits to count. The packet after the BS addition is forwarded to either an action section or a switch section of the bitstream engine based on the additional service-specifying bits.

For a marked packet, i.e., one which already has a BS inserted in it, the packet is sent to the parser. The parser extracts the relevant bits (up to $4(\log_2(k)-2)+n$) and routes the packet to the action/switch section of the bitstream engine.

If any of the n additional bits are set, then the packet is sent to the "action" section of bitstream engine. The action section invokes a separate hierarchy for dealing with the packet. The action section is where all actions apart from forwarding are performed such as: packet reordering, TTL decrement, or any other experimental actions that may be introduced. Each of the n bits correspond to a particular action that needs to be performed. The action section after processing the packet, sends it to the switch section for forwarding to the requisite port (based on $4(\log_2(k)-2)$ bits). The pointer is then incremented by up to $4(\log_2(k)-2)+n$ bits at the output port. For forwarding the packet, a hardware encoded logic is used in the switch section, which has an output port (one of the VOQ buffers) assigned for each combination of the $4(\log_2(k)-2)$bits. We again note that once a packet is marked, a node only considers the BS for forwarding or for any other protocol function to be implemented and does not further rely on table lookups.

Figure 2:
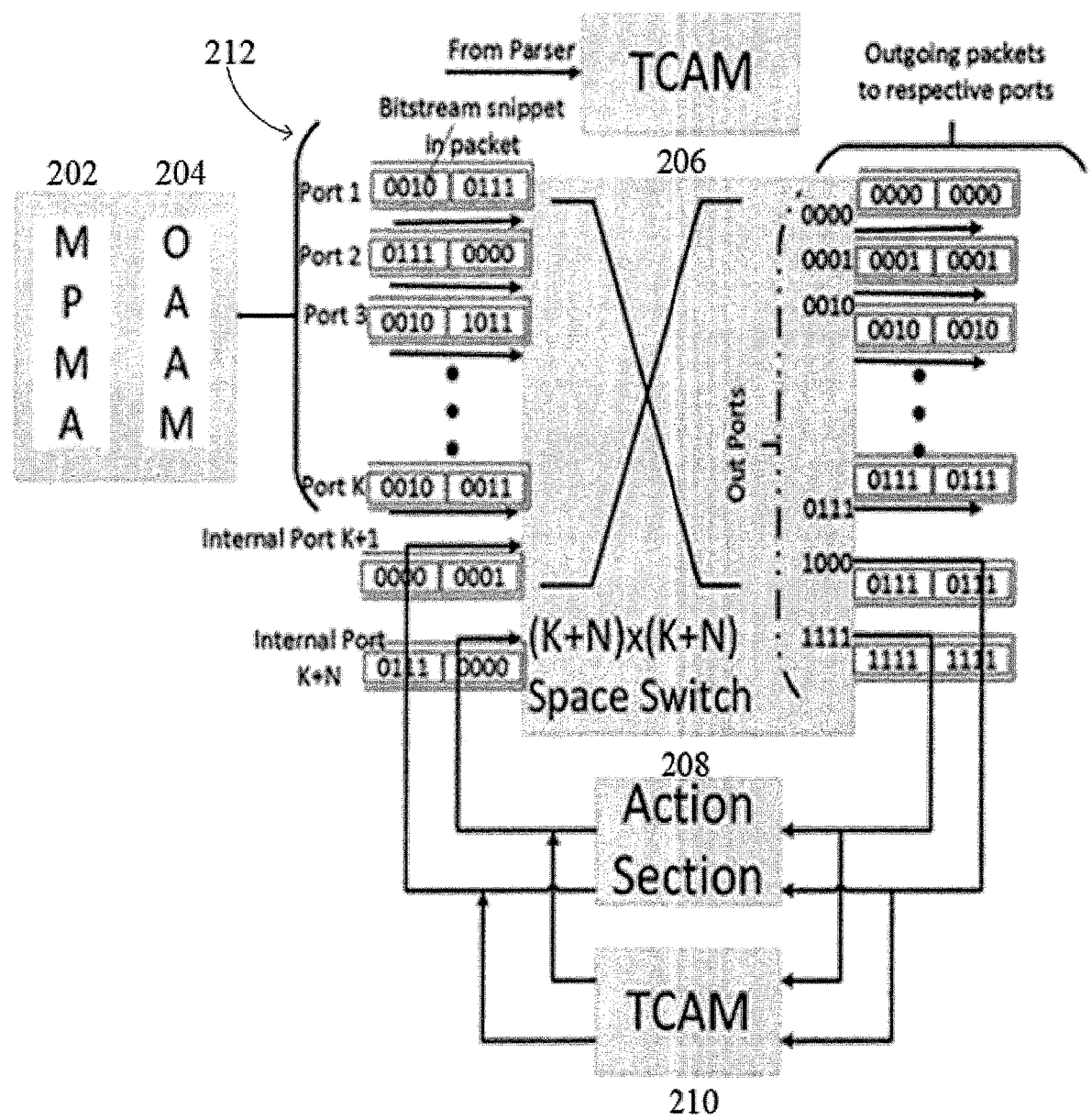
FIG. 2 illustrates data plane architecture of a bitstream switch in accordance with some embodiments described herein.

FIG. 2 illustrates data plane architecture of a bitstream switch in accordance with some embodiments described herein. Specifically, FIG. 2 illustrates a k×k switch that supports bitstream. In this figure, packets arrive at ports 212 and are parsed (at 202) prior to arrival. Packets are first encoded with the BS and then sent to the switching fabric 206. If a packet requires only a forwarding operation, then it is directly routed to the destination port based on up to $4(\log_2(k)-2)$ bits. If, however a packet is to be further processed or manipulated then it is forwarded by the switch 206 to the action section 208, which can be reached through one of the n extra ports. The packet after the action section 208 is sent back to the switch 206 which now sends it to a corresponding egress port. The journey of a packet through the action 208 and switch 206 together is defined by $4(\log_2(k)-2)+n$ bits in the BS. Typically, k can be of the range 12-64 ports depending on the line rate on a per-card basis. In the described embodiments a 33-port switch is facilitated in the front plane and 66 ports in the backplane.

Multicast Handling

Multicast is handled different from unicast. A bitstream snippet for multicast is generated in a different manner. The label of a multicast packet is differentiated by a custom Ethertype tag. The node receiving the packet now knows that the packet is of multicast type. The node checks for the pointer-value and then extracts D bits (D is the degree of the node), which denote a multicast vector for forwarding the packet to the appropriate multicast ports. The protection aspect of multicast requires that the controller find a node-and-edge-disjoint tree. This problem is shown to be NP-hard (see e.g., M. Médard, S. G. Finn, R. A. Barry, and R. G. Gallager, "Redundant trees for preplanned recovery in arbitrary vertex-redundant or edge redundant graphs," IEEE/ACM Trans. Netw., Vol. 7, No. 5, pp. 641-652, October 1999). An elegant solution with some relaxations for handling multicast is shown in Oliveira, Carlos AS, and Panos M. Pardalos. "A survey of combinatorial optimization problems in multicast routing," Computers & Operations Research, Vol. 32 No. 8, pp-1953-1981, 2005. Multicast is implemented similar to the OE scheme and BIER schemes, see e.g., Wijnands, I J, et al., "Multicast using Bit Index Explicit Replication," draft-wijnands-bier-architecture-00; Sep. 22, 2014.

Ports are identified for multicast and port-vectors that are node specific are created. These port-vectors are conjoined to create the bitstream snippet. The port-vectors in our scheme are similar to port-masks in the BIER scheme (which is entirely layer 2.5/3 multicast), whereas our scheme could be implemented for multicast at any layer.

Carrier Class Support

A carrier-class support is defined through features such as: 50 ms restoration post a node/edge failure; service provisioning; service monitoring and deterministic latency. The bitstream scheme facilitates the former through the proven method of incorporating IEEE802.1ag (or ITU.T Y.1761) connectivity and fault management standard. For each provisioned service, we mark the edge nodes of the service as management end-points (MEPs). MEPs exchange bidirectional connectivity check messages (CCMs) every 10 ms. It is essential that this "control plane" follows the same path as the data-plane and is distinguished by its unique quality of service (QoS) value. Loss of 3 consecutive CCMs triggers the destination to begin accepting traffic on the protection path. This sort of protection is 1+1 (always ON) type and could potentially be replaced with less aggressive schemes. The adoption of the 802.1ag standard facilitates monitoring, path continuity check, etc. Deterministic latency is achieved through simplistic forwarding.

Backward Compatibility and Interoperability

The closed domain interacts with hosts and other networks as a pure L2 network within which users can provision any service. A flow can be made to pass (as a transparent service) through the closed domain or as a specific protocol compliant service depending on the provisioning status. The closed domain accepts any traffic that supports Ethernet interfaces. It is pertinent to note that a closed domain can be a single node supporting the bitstream protocol or a country-wide WAN.

Bitstream Hardware: Parser, Tables, Switch Fabric

Figure 3:
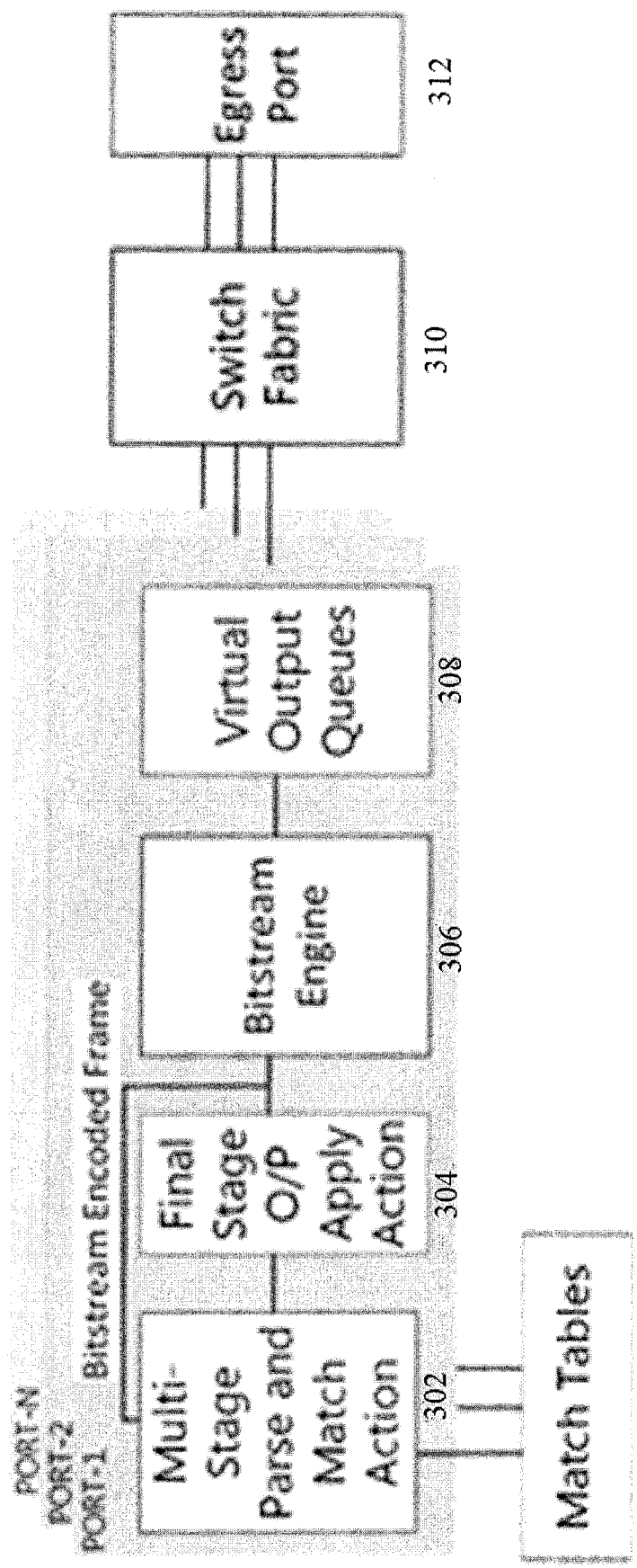
FIG. 3 illustrates bitstream hardware logical modules in accordance with some embodiments described herein.

FIG. 3 illustrates bitstream hardware logical modules in accordance with some embodiments described herein. Specifically, an implementation of the bitstream hardware is illustrated. The bitstream hardware consist of multiple match-tables and logical modules.

Logical blocks within the bitstream hardware are shown in FIG. 3. Each IO port is connected to: a multi-stage parser and match action module (MPMA) 302, an output apply action module (OAAM) 304, bitstream engine (BE) 306 and virtual output queues (VOQs) 308. The switch fabric module 310 and match-tables 314 are common across all the ports.

Match Table

FIG. 4 illustrates a match table structure in accordance with some embodiments described herein. Specifically, FIG. 4 shows the different fields contained in each entry in the match-table. The fields in each entry of the match table are defined as follows:

| | |
|---|---|
| Key | Matched against the fields provided by the parser. |
| Offset | Indicates the location in the packet for the parser to extract data or to insert/modify a field |
| Length | Provides the length of the field (protocol identifier or bitstream snippet) to be extracted from the packet or to be inserted into the packet. |
| Instruction | Provides the action or routing information details required for packet processing at a node. The instruction field is further divided into three sub-fields:<br>(a) Action: provides the action information that needs to be executed on the packet, i.e. push or pop or swap a label/tag, decrement TTL, set VLAN, drop packet, add bitstream snippet, etc. |

| | |
|---|---|
| | (b) Type: has information pertaining to the Ethertype which is useful in case the action instruction requires to add tags i.e. VLANs, MPLS, PBB, etc.<br>(c) Value: has information corresponding to the action to be executed, i.e. for adding a label, it has a label value; for swapping labels, it has a new label value to be swapped; for bitstream addition, it has a bitstream snippet for the default and protection route along with QoS value. |
| Flags | Are provided to process the table information in the parser stages correctly. We define three types of flags: (a) SET_OLI: decides if subsequent parsing of the packet in parser stages is required; (b) Apply_Action: informs whether the instruction field contains a valid action that needs to be executed on the packet; (c) Apply_Key: allows the parser to directly set the "value" field of the instruction as a key for the next stage match-action. |
| Mask | The mask is used when a partial match of the key is sufficient to get an instruction i.e. subnet mask for IP. This allows the match-action logic to initiate a match against a key only for the masked bits of the field. |

The Offset, Length and Instruction (OLI) fields together constitute an OLI value, which is used for processing a packet in the parser in the bitstream hardware. The OLI value is generated and written in match-tables by the controller.

Multi-Stage Parser and Match Action (MPMA)

Figure 5:
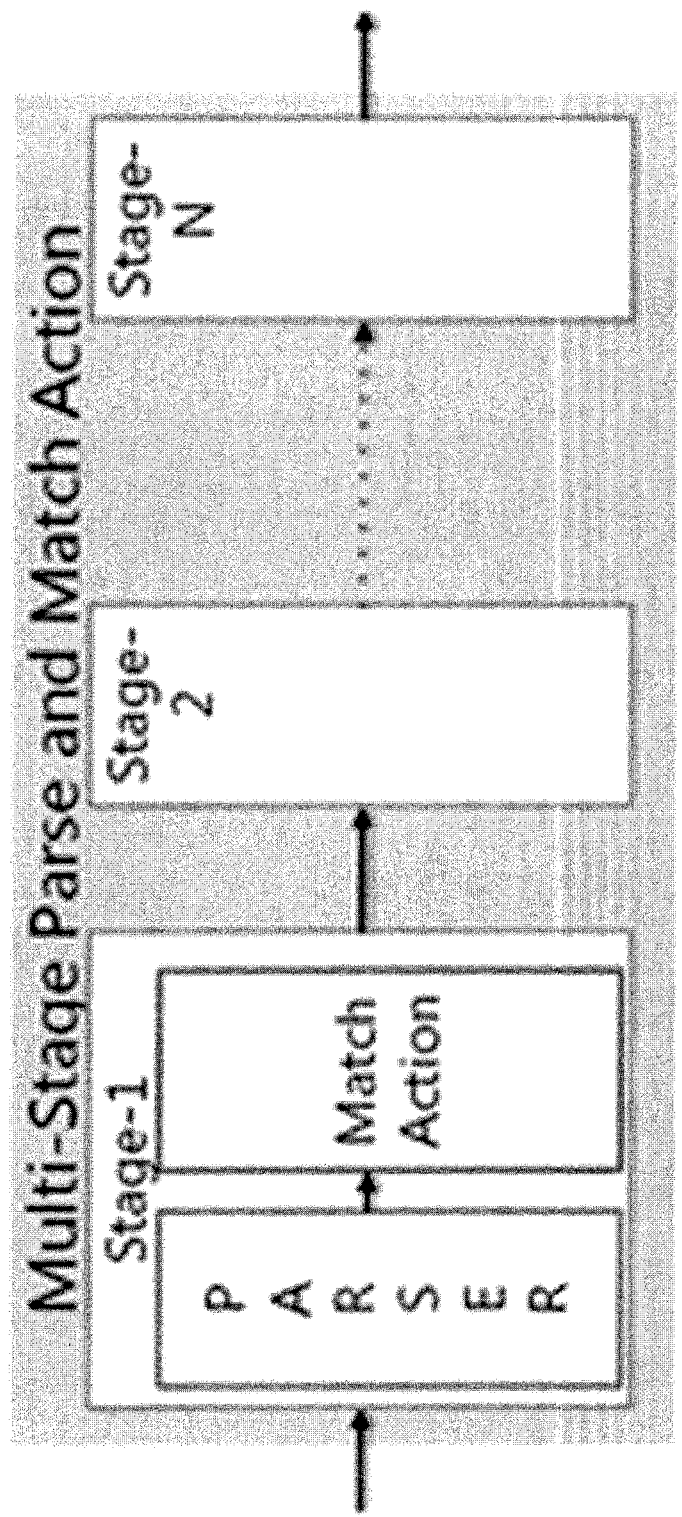
FIG. 5 illustrates a multi-stage parse and match action in accordance with some embodiments described herein.

FIG. 5 illustrates a multi-stage parse and match action in accordance with some embodiments described herein. Specifically, the MPMA is divided into multiple stages, where each stage has a parser and a match-action logic. Every incoming packet is initially processed by the MPMA. The parser first checks if a packet is marked i.e., contains a BS. If the packet is marked, then the parser extracts up to $4(\log_2(k)-2)+n$ relevant bits based as per the pointer and forwards the packet to the BE. If the packet is unmarked, then the parser extracts the match fields based on the OLI value in the subsequent stages. The parser in the $1^{st}$ stage is set by default to extract the source and destination MAC address and corresponding Ethertype field. The parser logic in the $1^{st}$ stage is programmable by the bitstream controller to extract any arbitrary field from the packet for $1^{st}$ stage match-action logic.

The parser in subsequent stages is programmed based on the OLI value returned from the match-table of previous stages. This programmability gives flexibility to the bitstream hardware to parse and process all types of packets. Based on the OLI value, the parser extracts the respective fields from the packet and forwards the extracted fields to the Match-Action logic, to be used as a key for matching in the table. Once a match is found a new OLI value and flags are obtained for the next stage. If the SET_OLI flag is true, then the parser of the next stage is programmed based on the obtained OLI from the table. If the SET_OLI flag is false, the instruction field returned from the table consists of a action-set or routing information. If the Apply Action field is true, then the instruction field returned by the table consists a action-set information which needs to be executed. If the Apply_Key flag is true, then the parser directly applies the information retrieved from the instruction field of the table as a key for match-action in the next stage.

For example, if a match-table returns the instruction to add an MPLS label (value 0x1234) and the Apply_Key is set as true. Then the MPLS label (with value 0x1234) will be applied as a key for obtaining a match lookup in the table in the next stage. Once all the parsing of a packet is done, a metadata is generated that constitutes key/OLI and instruction information received in the parsing stage. This metadata along with the packet is forwarded to the OAAM module for further processing. The final action is the addition of the BS in the packet leading to successful forwarding through the node.

Output Apply Action Module (OAAM)

The OAAM module 304 receives the metadata and the packet from the MPMA 302. The metadata consists of a set of actions (such as decrement TTL, Push/Pop tags, Swap label, add BS etc.) and routing information in the form of a BS received from the match-tables. The OAAM module processes and applies these set of actions and marks the packet by embedding the BS. After all the actions are completed, the packet is forwarded to the bitstream engine 306.

Bitstream Engine (BE)

The BE module is responsible for the processing of all the data packets as well as control packets (packets that are exchanged between the controller and the bitstream switch i.e. ping, echo, Con fig etc.). BE consist of the CSM, action and switch sections. The CSM section is used for the interaction with the SDN controller. The action section is required to perform operations that cannot be performed simply by match-action in the previous stages (such as reordering of packets, etc.). The specific action to be undertaken is decided based on the n-additional bits of the BS relevant to that node. The switch section is responsible for processing all the marked packets. As previously described, the switch section identifies the egress port for the packet by following the $4(\log_2(k)-2)$ bits from the valid pointer location of a BS. Once the switch section identifies a valid physical egress port, the used bits are then invalidated by incrementing the pointer of the BS by up to $4(\log_2(k)-2)+n$ number of bits that were used in identifying the physical port and action section processing. This allows the switch section to take a forwarding decision based on the unused/valid bits of the BS. The BE also checks the status of the egress port after identifying a physical port as to whether the egress port is within the closed domain. In case the port is outside of the closed domain, it strips the custom Ethertype and BS from the packet. This process facilitates interoperability with conventional networks.

Switching Module

The switching module includes the switch-fabric 310 and an arbiter for each egress port 312 for packet scheduling from the VOQs 308 and is coded using 6×1 multiplexers in VHDL. Based on the buffer occupancy in the VOQ, an egress port arbiter selects the appropriate queue to transfer a packet.

Bitstream Controller

Figure 6A:
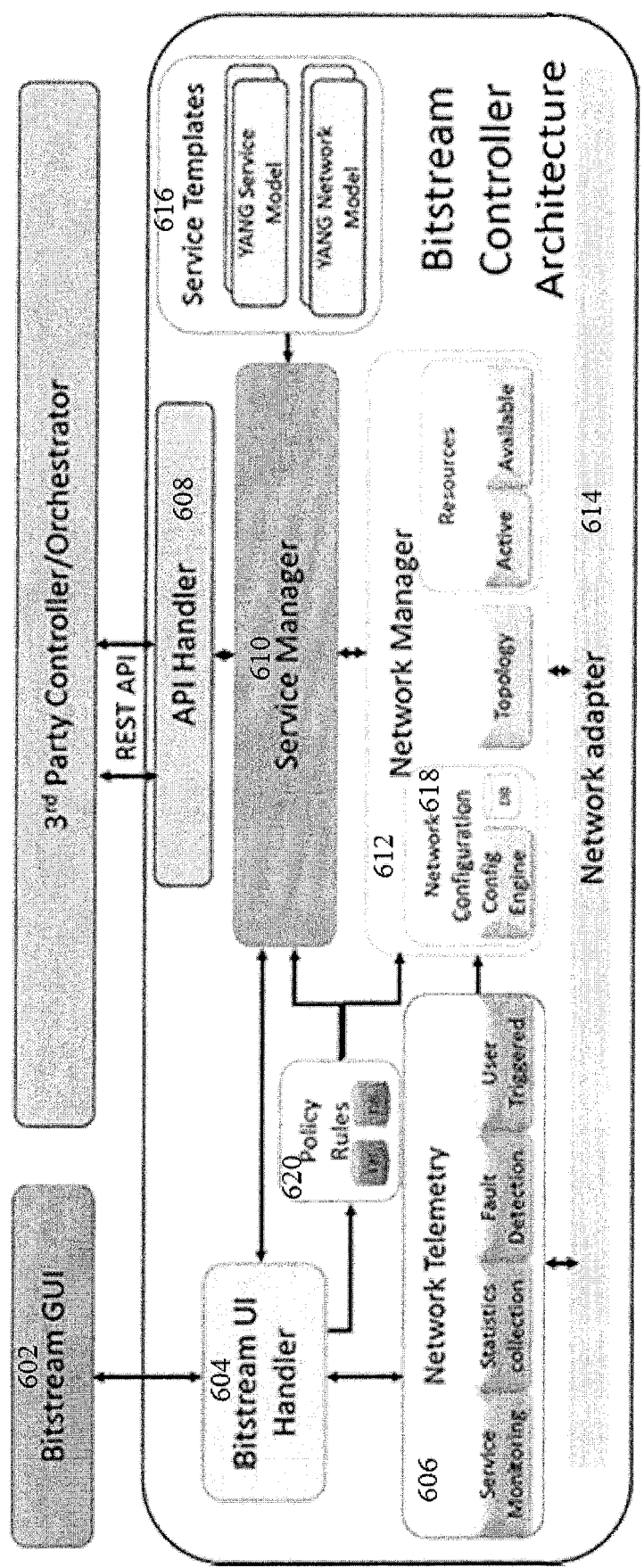
FIG. 6A illustrates a bitstream controller architecture in accordance with some embodiments described herein.

FIG. 6A illustrates a bitstream controller architecture in accordance with some embodiments described herein. The bitstream controller provides functionality to capture and translate user requests into the flows/services that are mapped to network resources in the closed domain. This translation is done either by using the pre-existing set of protocols (such as IPv4, IPv6, VLAN, MPLS etc.) or by user-defined protocols/services. New/existing protocols are defined in the service templates' repository 616 of the controller. The controller also allows a user to define the set of policies related to the physical resource mapping and routing of the service.

Figure 6B:
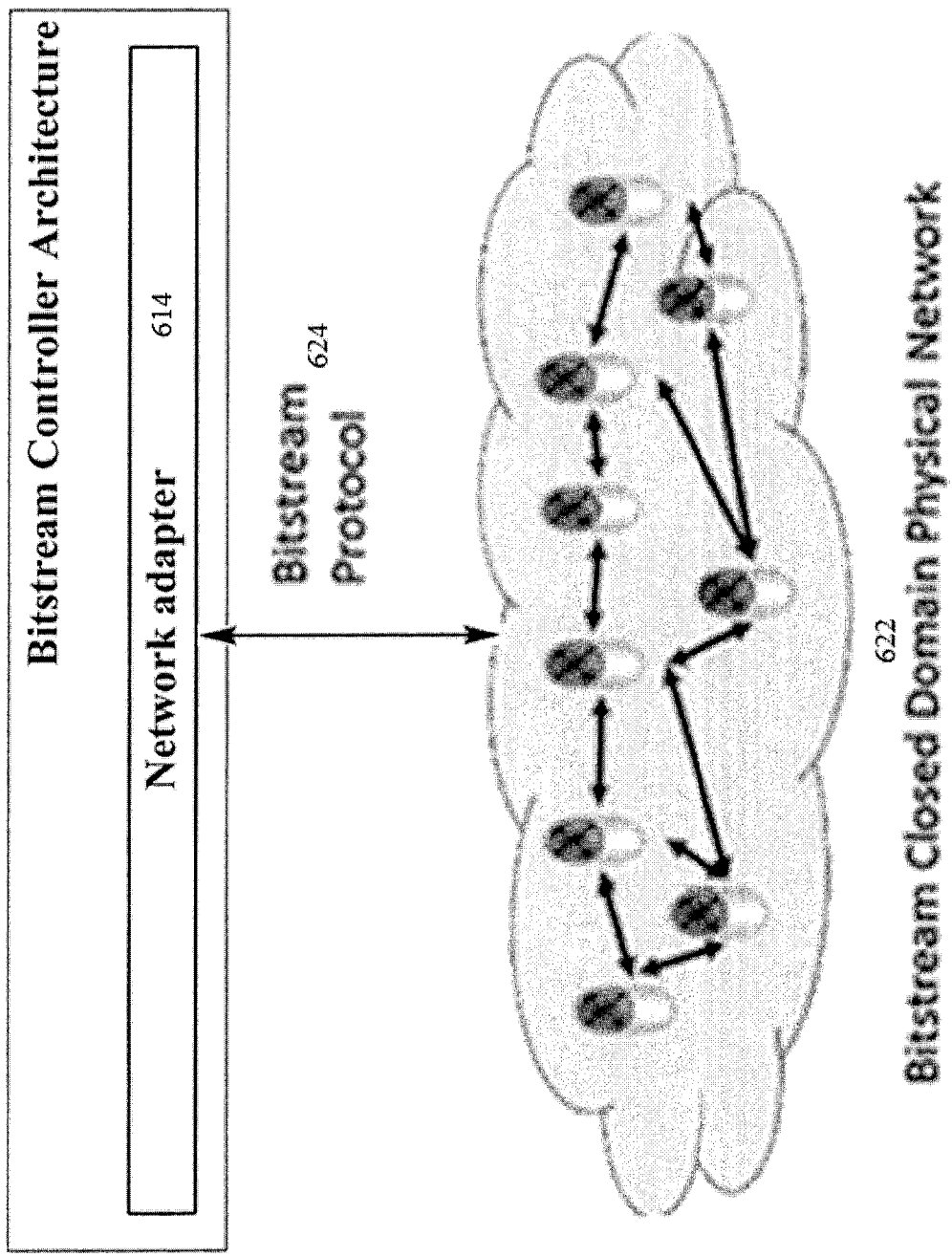
FIG. 6B illustrates exchange of control messages between a network adapter in the bitstream controller architecture and the bitstream closed domain physical network in accordance with some embodiments described herein.

FIG. 6B illustrates exchange of control messages between a network adapter 614 in the bitstream controller architecture and the bitstream closed domain physical network 622 in accordance with some embodiments described herein. The controller keeps tracking the status and monitors network health by periodically exchanging control messages 624 with bitstream nodes in the closed domain 622. Key control messages 624 for the SBI are listed in Table I.

TABLE I

Key control messages

| | |
|---|---|
| Ping | Is initiated by the controller. A bitstream node broadcasts this message after receiving it from the controller or other bitstream nodes |
| Echo | Is sent by each bitstream node to the controller as a response of a Ping Message. An echo message conveys hardware capabilities, such as ports, connections, cards etc. In addition this message also carries port status and information of the connected neighboring nodes |
| Config | Is sent by the controller for writing the match/lookup rules into the match-tables of the bitstream hardware |
| Config-ack | Is sent by the bitstream node in response to a Config Message, when match/lookup rules are successfully written in the match-table |
| Config-nack | Is sent by the bitstream node in response to a Config message when match/lookup rules cannot be written in the match-table |
| Connectivity check | Is sent by a service ingress bitstream node to a service egress bitstream node for fault detection. |
| Monitor | Is sent by the controller to get the statistics of a service/node |
| Monitor reply | Is sent as a response to the Monitor Message. This message contains the statistical information about a parameter described in the monitor message. The reply may include packet drop count, latency of a service etc. A bitstream node periodically sends this message to the controller. |

Network Manager

The network manager module 612 maintains the current state of the closed domain network by storing information pertaining to available resources (nodes and their capabilities) and provisioned services in a database. This module discovers the network topology and capabilities of the nodes by using ping and echo messages, and subsequently forms a node-adjacency matrix. This adjacency matrix is used to create a network graph representing the real-time network topology. Based on the extracted information, the network manager 612 also updates its resource inventory in its database. The network manager 612 uses this network topology and resource inventory information to map the service configuration request received from the service manager 610. After the configuration request is successfully mapped by the network manager 612 to the physical network, node configuration is initiated by the network configuration submodule 618 using a config. A node responds to the config by a config-ack if the node is configured successfully, else the node responds with a config-nack.

In the case that the network manager 612 receives a config-nack, then the config message is resent. This process is repeated until a time-out occurs. On reaching a time-out, all nodes related to the unsuccessful service request are rolled back to their previous state by using the earlier configuration stored in the network manager database.

Bitstream Handler

The bitstream handler module 604 classifies the requests originating from the bitstream GUI application 602 and forwards them to an appropriate controller module. There are three types of requests a) service configuration; b) service monitoring; and c) policy updates. Based on the request type from the GUI application 602, the bitstream handler module 604 forwards the request to Service manager 610, Network Telemetry 606 or Policy rules module 620.

Service Manager

The service manager 610 handles all the requests related to a service configuration. A user can request a service configuration either by using a GUI or possibly through a REST API. We define two types of service requests: a) predefined service request such as MAC, IP, CTAG/STAG based; and b) user-defined service request in which a user can specify any protocol. A service request contains the service parameters provided by the user at the time of request such as the source/destination address, protocol, bandwidth requirement, QoS and additional service requirements etc. The service manager 610 interprets the service requests using the parse tree in conjunction with the available service templates in the repository 616 (stored as YANG models), and extracts the service parameters required for configuration. Once all the required parameters are available, the service manager 610 attempts to find edge-and-node-disjoint routes for the primary and protection paths. Assuming that such routes exist, the service manager 610 prepares the NFGs for both the paths. These NFGs along with the extra bits for the additional protocol processing are conjoined together to obtain the bitstream snippet (BS). Once all the service parameters along with the BS are available for configuration, this information is passed to the network manager module 612 for the hardware configuration.

For example, let us assume that the service manager 610 receives a service request that requires forwarding based on a TCP flag value. In this case, the service manager 610 uses the parsing tree to extract the service parameters (i.e., protocol identifiers and their respective OLI) by traversing the tree from its root. Service templates 616 are used to map these identifiers and service parameters to create this service.

Figure 7:
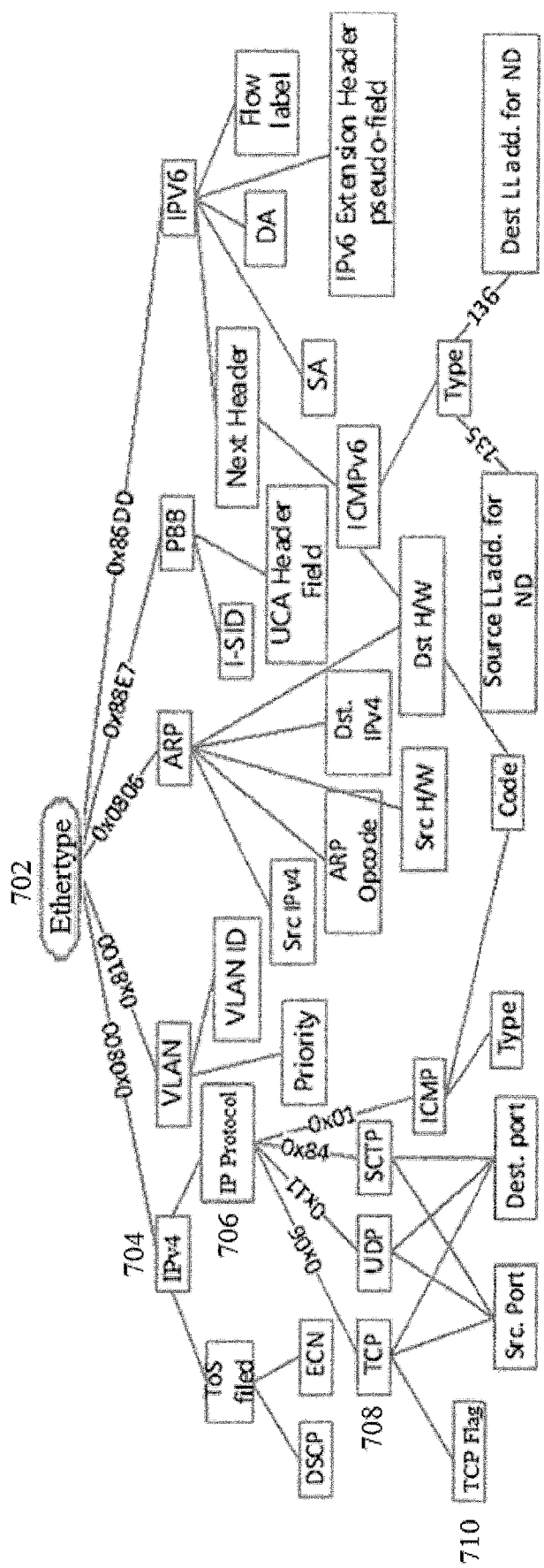
FIG. 7 illustrates a parse tree for popular existing protocols in accordance with some embodiments described herein.
Figure 8:
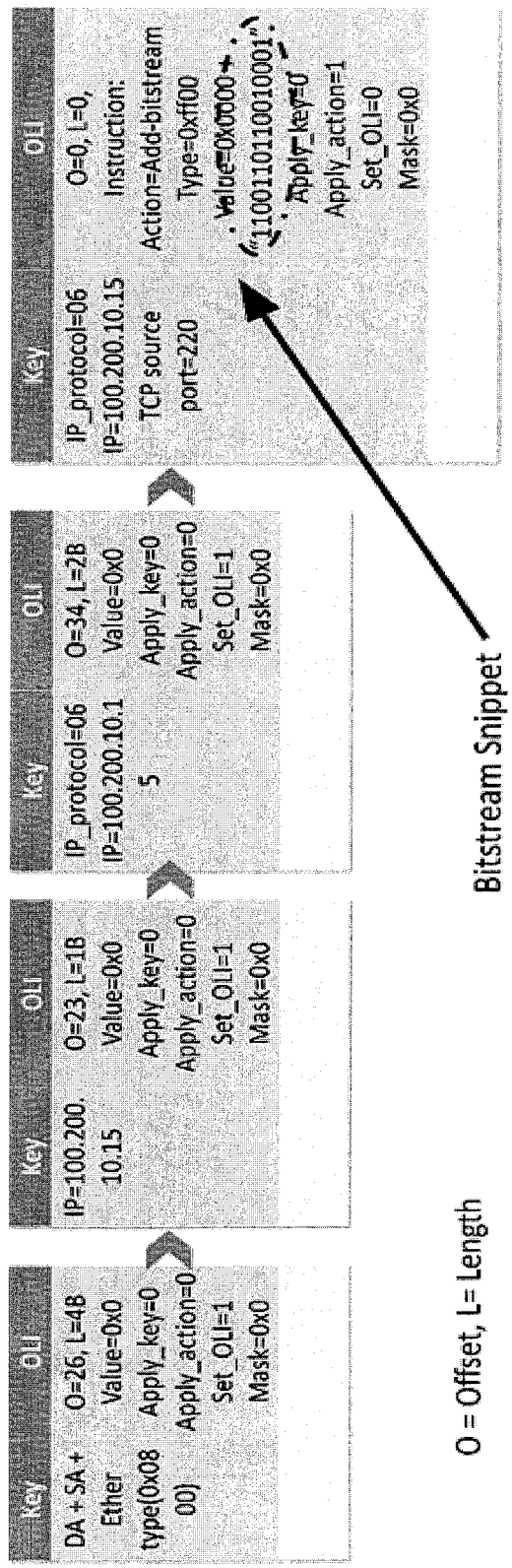
FIG. 8 illustrates a multi-stage match action table in accordance with some embodiments described herein.

FIG. 7 illustrates a parse tree for popular existing protocols in accordance with some embodiments described herein. The service manager traverses the following path in FIG. 7: Ethertype 702→IPv4 704→IP Protocol 706→TCP 708→TCP flag 710. A service corresponding to this path requires that the packet has an Ethertype of 0x0800, a specific IP address with the protocol field in the IP header to be 0x06 and a specified TCP flag. The bitstream hardware should match all these fields for the specified service request. The required OLI and other service parameters are provided to the network manager for writing the service configuration in the match-table as shown in FIG. 8.

Network Telemetry

A Network Telemetry module 606 monitors and gathers performance metrics from the closed domain. For service monitoring and fault detection, this module creates MEPs at service ingress and egress nodes. The MEPs periodically exchange connectivity check messages (CCM). Loss of three consecutive CCMs results in an alarm and switchover from the work to the protection path. Subsequently, an alert is sent to the GUI for updating the palette and database. A user can trigger real-time performance monitoring (i.e. latency, jitter, throughput and packet-loss) for any specific service through the bitstream GUI. This module also gathers node statistics by sending the monitor messages periodically to all the nodes in the closed domain. After receiving a monitor message, the node replies with the monitor reply message that contains statistics related to the service such as packet-count, dropped packets, latency, throughput, etc. This module maintains a repository of such statistics and events for analysis.

Bitstream GUI

A bitstream GUI 602 interacts with all other modules through the bitstream handler 604 and displays the required information to the user. A user gets the complete view of the closed domain topology in the GUI. The GUI is presented in FIG. 16. The GUI facilitates a user to select a service request either by using a set of predefined protocol-based services (i.e. MAC, IP etc.) or by selecting any new protocol-based service (given that the service template for a new service is defined and available to the service manager). The bitstream GUI 602 also allows a user to define policy rules such as routing decisions, resource allocation etc., which needs to be followed during service configuration. The bitstream GUI also interacts with the Network Telemetry module 606 to get the near real-time statistics of the network.

Service Templates

The service templates module 616 keeps the repository of all the service and network model templates. These templates are defined using YANG models. Any new service or new protocol is first defined and added in this module.

YANG Model Example:

A Pseudocode (presented below in this disclosure) shows a YANG model for an IPv6 (point-to-point) leased-line service. The model initially defines MAC, IPv4 and IPv6 addresses types. After defining the required protocols, the client address, (which can be of type MAC, IPv4 or IPv6 is defined) followed by the uniqueness of the bitstream closed domain—NFGs are defined. The NFG definition is important since primary and protection paths for the service are concatenated from the NFGs along the path. After defining the required parameters, the actual service definition is presented in the service container. The service container has an address container to store the source and destination client addresses (expressed as source and destination leaves). The service container also includes a statistics container that depicts the parameters supplied by the user in order to configure the service. These parameters are defined by: bandwidth, CBS and the QoS leaves. The service container also stores the path information in the container path. The path container includes primary and protection path containers that consist of the leaf-list of the NFGs.

Packet Processing and Illustrations

Figure 9:
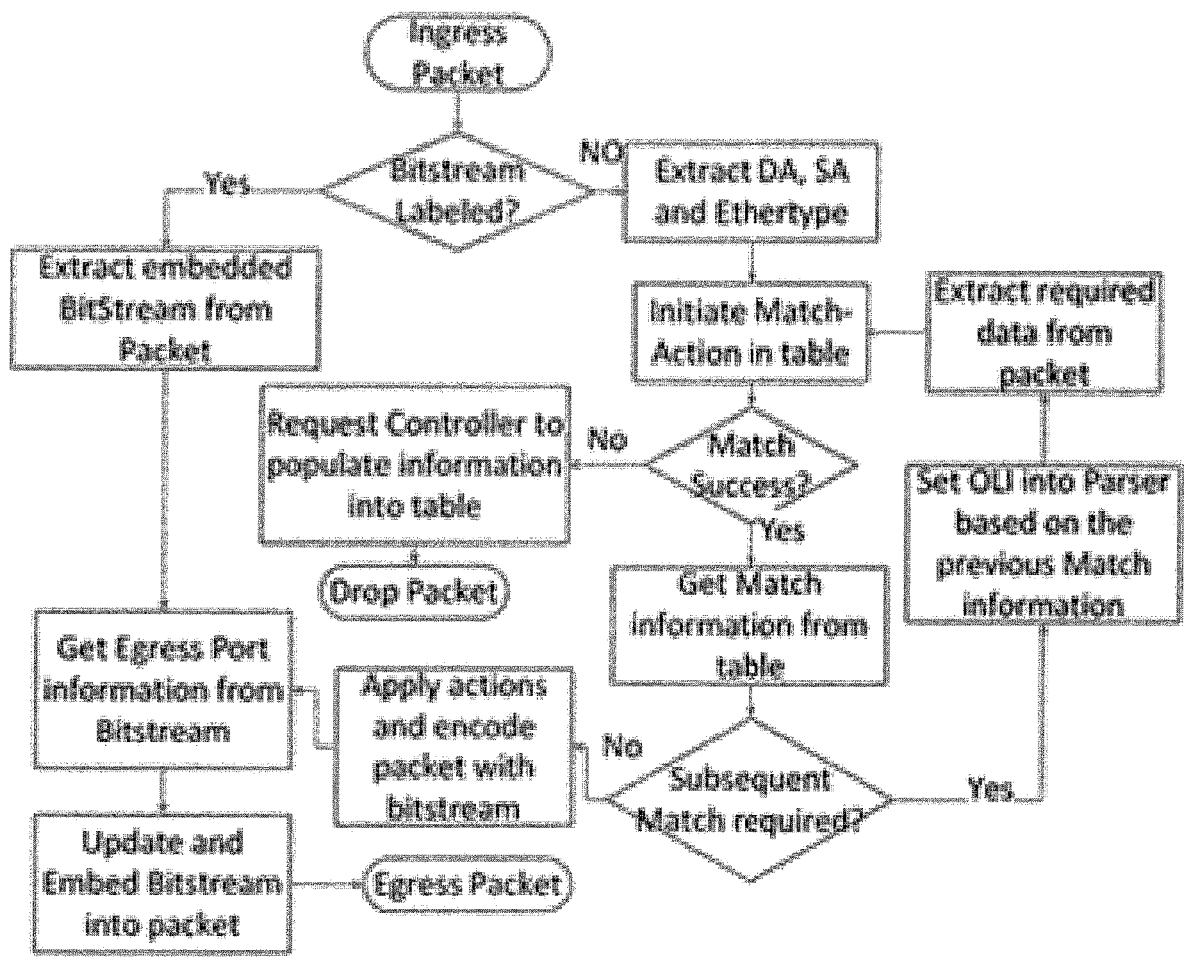
FIG. 9 illustrates a packet flow chart in accordance with some embodiments described herein.

FIG. 9 illustrates a packet flow chart in accordance with some embodiments described herein. Specifically, FIG. 9 shows a flowchart for packet processing implemented by the bitstream hardware. An incoming packet is checked if it is marked or unmarked with a BS. A marked packet is directly forwarded to the bitstream engine for further processing. This direct forwarding to a bitstream engine benefits the packet to achieve low-latency. If a packet is unmarked, it is processed by the MPMA module and matched sequentially against multiple tables resulting in the generation of a BS. Although sequential matching adds to the delay at the ingress node, this is a one-time effort and subsequently BS based forwarding results in overall lower latency.

Table V shows detailed treatment in the bitstream framework of all protocols that OpenFlow can support. We now consider two examples for protocol processing.

Illustration-1: Consider as an example, L4 processing in the bitstream hardware. We assume the parser of the $1^{st}$ stage is programmed to extract Destination MAC (DMAC), Source MAC (SMAC) and Ethertype and assume that there exists a table entry for the Ethertype=0x0800, IP=100.200.10.15, TCP_source port=220 (see FIG. 8). In the first stage, Ethertype 0x0800 is matched and OLI corresponding to IPv4 address is obtained. In the second stage, the extracted IPv4 address (100.200.10.15) is matched and OLI for IPv4 protocol type is obtained. In the third stage, IPv4 address along with protocol type (0x06) is matched and an OLI for TCP source port is obtained. In the fourth stage the IPv4 address along with IPv4 protocol type and TCP source port are matched and finally the BS is obtained. After obtaining the bitstream snippet, all the set of instructions along with BS are forwarded as metadata to the OAAM. The OAAM applies this set of instructions on the packet and adds the bitstream snippet to the packet. The packet is marked by setting custom Ethertype=0xFF00. This marked packet is then forwarded to the BE. The BE identifies the egress port using the embedded pointer and bitstream information from the packet. Note that any forwarding rule or ACL processing (table-lookup, TTL, swap, etc.) happens only once during the packets journey through a bitstream network, and thereafter at other hops the packet only undergoes NFG based forwarding (this limitation of processing only once can easily be relaxed in future hardware versions).

Illustration-2:

Assume that the VXLAN protocol is to be added to the existing SBI protocol suite. To this end, the controller maps ingress/egress MAC addresses to the VXLAN tunnel endpoint (VTEP) and writes the rules in the table with appropriate OLI values. The controller programs the parser at the ingress node to extract the MAC address from the packet. The extracted MAC address is matched in the table and an OLI is received with add instructions to add the outer L2 header information at an offset=0x00 in the packet. In the second stage, the outer MAC is used as a key to match against the table and the next OLI is received with add instruction to add the outer IP header information at an offset=0x0d, indicating the $14^{th}$ byte position in the packet. In a similar way, a UDP header and the VXLAN header are also added. At the end, the bitstream header is added in the packet. This whole process is done only at the ingress node. It can be concluded that the bitstream hardware is oblivious to a protocol. The controller simply manipulates the table with corresponding identifiers resulting in forwarding and specific processing.

Optimization Model and Classifying Performance

Some of the embodiments described herein, compute which protocols should be processed at which nodes and how to distribute such logic for a particular network and given traffic. Some of the embodiments described herein, process protocols that require processing that is beyond just forwarding (such as TTL should be done at the end of a path). The processing may have to be done once or multiple times for a particular service, and it may have an order of precedence (swap followed by decrement TTL). Essentially this means that there is code developed to process a protocol in the action section of a BS-enabled device, but since there are a large number of protocols, we want to compute where to place such code in a network. From a system design perspective, the challenge is that the processing unit size and memory in a node are also constrained. Hence, based on the network topology, work and protection requirements and a given traffic profile, processing code is distributed across the network such that service parameters (e.g., latency) are satisfied. This leads to a constrained optimization model. The goal of the model is to minimize overall delay across all the services in the network. For the optimal placement of processing code that is to be distributed across a closed domain, we assume a given network, a set of y protocols, bandwidth and processing capacities at nodes and the observed latency for processing a particular protocol. Optimization parameters are shown in Table II.

TABLE II

Parameters and decision variables

| | |
|---|---|
| G (V, E) | Network graph of set of V nodes and set of E edges |
| $C_j$ | Bandwidth capacity of node j:j ∈ V |
| $D_j$ | Processing capacity of node j:j ∈ V |
| P | Set of protocols $\{P_1, P_2, \ldots, P_y\}$ |
| $\bar{P}$ | Set of protocols $\{P_x, P_{x1}, \ldots, P_y\}$, where x < y |
| $T_{abkm}^{Pn}$ | $m^{th}$ instance of traffic request on the $k^{th}$ path between node a and b for protocol $p_n \in P$ |
| $PM_{ab}^{k}$ | Set of nodes on $k^{th}$ path between node a and b |
| $d_n$ | Processing delay of protocol $p_n \in P$ |
| $\theta_{abkm}^{Pn}$ | $\begin{cases} 1, & \text{if } T_{abkm}^{Pn} \text{ is provisioned} \\ 0, & \text{otherwise} \end{cases}$ |
| $\alpha_{abkm}^{Pnj}$ | $\begin{cases} 1, & \text{if } T_{abkm}^{Pn} \text{ is provisioned and } p_n \text{ is} \\ & \text{processed at node } j, \\ 0, & \text{otherwise} \end{cases}$ |
| $\beta_{ab}^{k}$ | $\begin{cases} 1, & \text{if path } PM_{ab}^{k} \text{ is chosen,} \\ 0, & \text{otherwise.} \end{cases}$ |

Objective Function:

The objective is to minimize the overall delay across all the services in the closed domain.

$$\min[\Sigma_{P_n}\Sigma_{a,b,k,m}\theta_{abkm}^{Pn} \cdot d_n]$$

Subject to the following constraints:

Traffic Provisioning Constraint:

The following constraint requires that every traffic request that we consider as part of the optimization model is provisioned.

$$\theta_{abkm}^{Pn} \cdot T_{abkm}^{Pn} \geq 0, \forall_a, b, k, m, p_n$$

Capacity constraint:

Each BS supporting device has fixed bandwidth for processing protocols and fixed processing power. The below constraint states that the sum of all bandwidth allocated to traffic at a node for processing as well as the sum of all processing power must be less than the capacity of the node.

$$\Sigma T_{abkm}^{Pn} \cdot \alpha_{abkm}^{Pnj} \leq C_j \forall_a, b, k, m, p_n, j$$

$$\Sigma T_{abkm}^{Pn} \cdot \alpha_{abkm}^{Pnj} \leq D_j \forall_a, b, k, m, p_n, j$$

Delay Constraint:

The traffic should be provisioned in a way that the individual traffic delay guarantees are met. Hence, $$\Sigma_{P_n \in P}\Sigma_{j \in PM_{ab}^k}\alpha_{abkm}^{Pnj} \cdot d_n \leq \Delta_n, \forall a,b,k,m$$

Protocol Processing Constraint:

The below constraint guarantees that each traffic request that is provisioned is always assigned to at least one node that processes the traffic request. Hence, we have, $$\Sigma_{\forall a,b,k,m, j \in PM_{ab}^k}\alpha_{abkm}^{Pnj} \geq 1, \forall\, p_n \in P$$

$$\Sigma_{j \in PM_{ab}^k}\alpha_{abkm}^{Pnj} + \beta_{ab}^k \geq 2, \forall\, a, b, k, m, p_n$$

The second equation above guarantees that processing for each traffic request occurs on the selected path.

Protocol Precedence:

$$\arg_j \alpha_{abkm}^{Pnj} < \arg_j \alpha_{abkm}^{Pnj'}, \forall_{j,j'} \in PM_{ab}^k \forall_a, b, k, m, p_n$$

The above constraint facilitates preordering of protocols that should be processed per service.

Evaluation:

The above constrained optimization model was developed as an integer linear program in Matlab using the linprog module and solved over a 30-node network (typical metro environment). The topology is a randomly generated mesh network with average degree of connectivity 3.4. Each node was assumed to be a 400 Gbps cross-connect with 2 ms of buffers per 10 Gbps port and 4×2.5 GHz duo processors that provided for the node action section, in addition to 8 Gbit of RAM. Two types of protocols were assumed: a group of 30 base protocols (those that required mere forwarding of packets based on some protocol identifier—such as IP/MAC/port etc.) and a group of 12-processing protocols (those that required processing beyond forwarding of packets). Flows were randomly generated in integer values in increments of 10 Mbps from 10 Mbps to 10 Gbps. Load was computed as the ratio aggregate total traffic in the network divided by average hop count to the total maximum traffic possible in the network.

Figure 10:
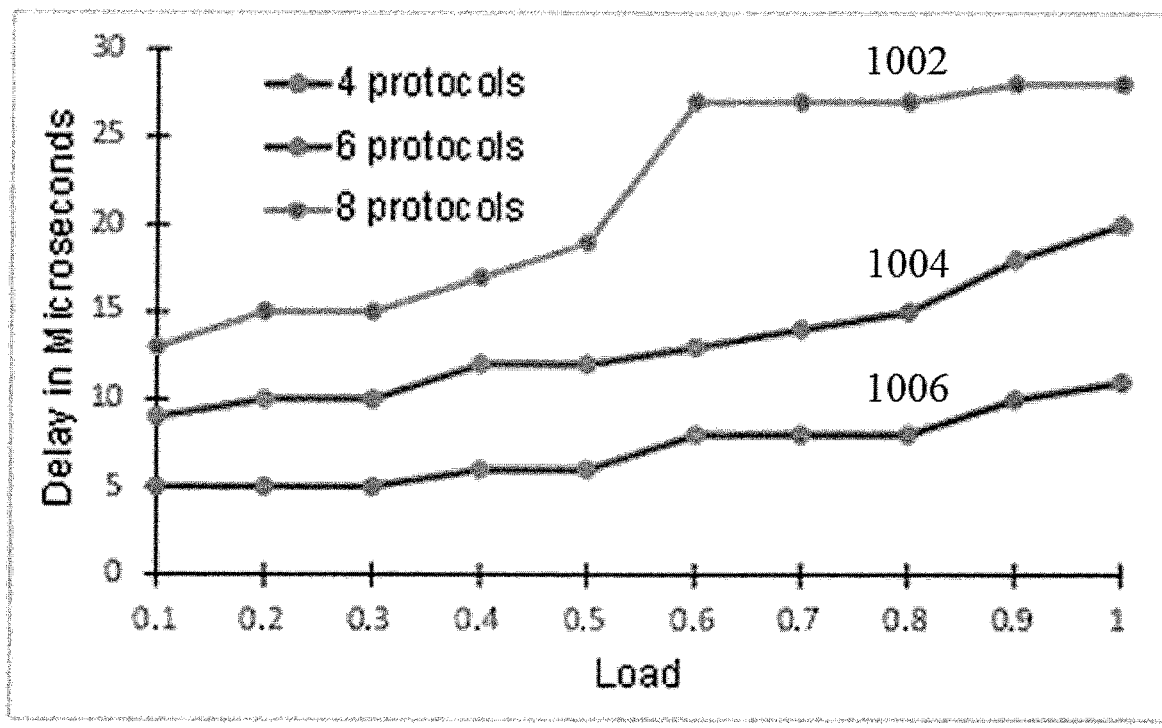
FIG. 10 presents a plot of delay vs load as a function of number of protocols processed at a node in accordance with some embodiments described herein.

FIG. 10 presents a plot of delay vs. load as a function of number of protocols processed at a node in accordance with some embodiments described herein. In FIG. 10, the curve 1002 corresponds to 8 protocols, curve 1004 corresponds to 6 protocols and curve 1006 corresponds to 4 protocols. Specifically, FIG. 10 shows a delay profile of the optimization model for various number of protocols that are processed (on average) at a node from the processing group. In this case, on average it takes 46 cycles of duration 8-ns and standard deviation of 4 cycles for processing of packets from the group. The counterintuitive observation is that the system balances itself out—beyond a certain number of protocols, there is not much change in latency. It can hence be said that for a particular switch size with given processing capacity, and given network topology, there is a maximum number of protocols that can be processed by the network. This is an important result as it shows the limitations of routing and need for load balancing.

Figure 11:
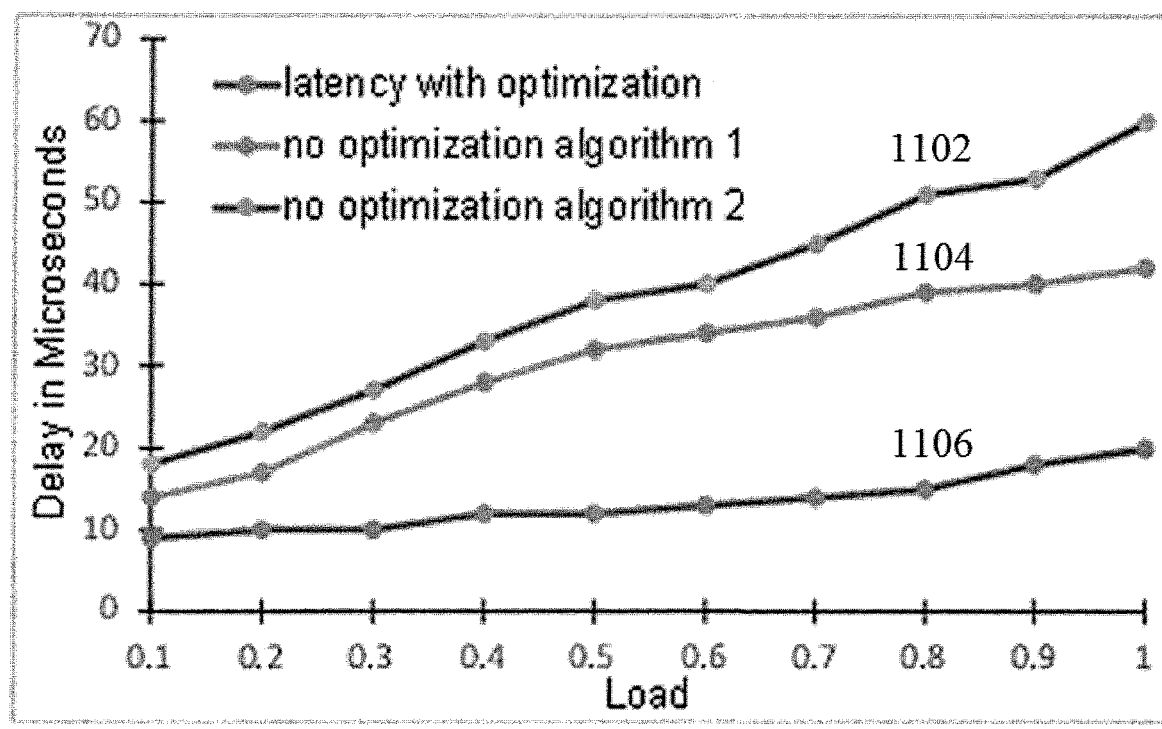
FIG. 11 presents a plot that compares optimization approach with two efficient algorithms in accordance with some embodiments described herein.

FIG. 11 presents a plot that compares optimization approach with two efficient algorithms in accordance with some embodiments described herein. In FIG. 11, the curve 1102 corresponds to second algorithm (#2) with no optimization, curve 1104 corresponds to first algorithm (#1) with no optimization, and curve 1106 corresponds to latency with optimization. The first algorithm (#1) is a planning and placement algorithm that uses a branch and bound technique to distribute processing modules among nodes in the network. The first algorithm initially gives equal processing capability at every node in the network for each protocol. Subsequently, the first algorithm reduces or enhances the processing capabilities on a per-node/per protocol basis till it reaches 'its' own best possible solution—this is not the optimal. It stores the recently achieved best solution and then continues to find another solution. If another better solution is found, then that is replaced with the best solution. The number of times this process is carried out is log ($T_{abkm}^{n}$) (a practical bound). The second algorithm (#2) is a random fit (with determined sizing). It randomly assigns processing capabilities to nodes initially and then dimensions these processing capabilities on the intensity of traffic request through the node.

We observe in FIG. 11 that the random fit and the branch-and-bound technique perform somewhat similar—which is not expected. The optimization results give us the lowest bound. The optimization technique is NP-hard—can be reduced to multi-dimensional bin-packing (see e.g., V.

Vazirani, Approximation Algorithms, Springer Science and Business Media, 2001 (4)). For low-loads the random algorithm with determined sizing performs similar to the branch-and-bound, and its complexity is low (of the order of $O(T_{abkm}^n)$ for $V_a$). The other key take-away is that the theoretical bound (expressed by the optimization technique) is almost flat. This has been verified for load between 0.6-0.8 for a large ~400 node network.

Classifying Performance:

In the following, a short analytical model is presented. The analytical model compares latency in the bitstream network to a conventional openflow network. For this comparison, a set of variables is defined in Table III.

TABLE III

| | Analytical variables |
|---|---|
| $\delta_t^{BS}$ | Avg. delay for a table match at an ingress node in the bitstream scheme |
| $\delta_{en}^{BS}$ | Avg. time required to encode a packet with a bitstream snippet |
| $\delta_{process}^{BS}$ | Time required to process a packet when pure forwarding is not to be followed (i.e. for swapping, decrementing TTL, etc.) |
| $\delta_{fwd}^{BS}$ | Time required for pure forwarding in bitstream through a switch |
| $\delta_{conv}$ | Time required for conventional routing/forwarding. |

For an h node path, the average delay (excluding propagation delay) for the bitstream network is:

$$\Delta_B = \delta_t^{BS} + \delta_{en}^{BS} + (h-2) \cdot (\delta_{fwd}^{BS}) + \delta_{process}^{BS}.$$

The corresponding delay for forwarding in an SDN scheme is:

$$\Delta_{conv} = (h-1) \cdot \delta_{conv}$$

The described embodiments show that $\delta_{conv} \approx \delta_t^{BS} - \delta_{en}^{BS} + (h-2) \cdot \delta_{fwd}^{BS} + \delta_{process}^B$ as $\delta_{process}^{BS}$ is negligible on two counts: (a) it is not as much invoked as $\delta_{fwd}^{BS}$ and (b) its value by itself is in nanoseconds as it is implemented purely in the hardware action section. Further, since the described embodiments act upon a few bits, $\delta_{fwd}^{BS}$ is by definition in the nanosecond range. This leads to $\Delta conv \approx (h-2) \Delta_B$.

Figure 12:
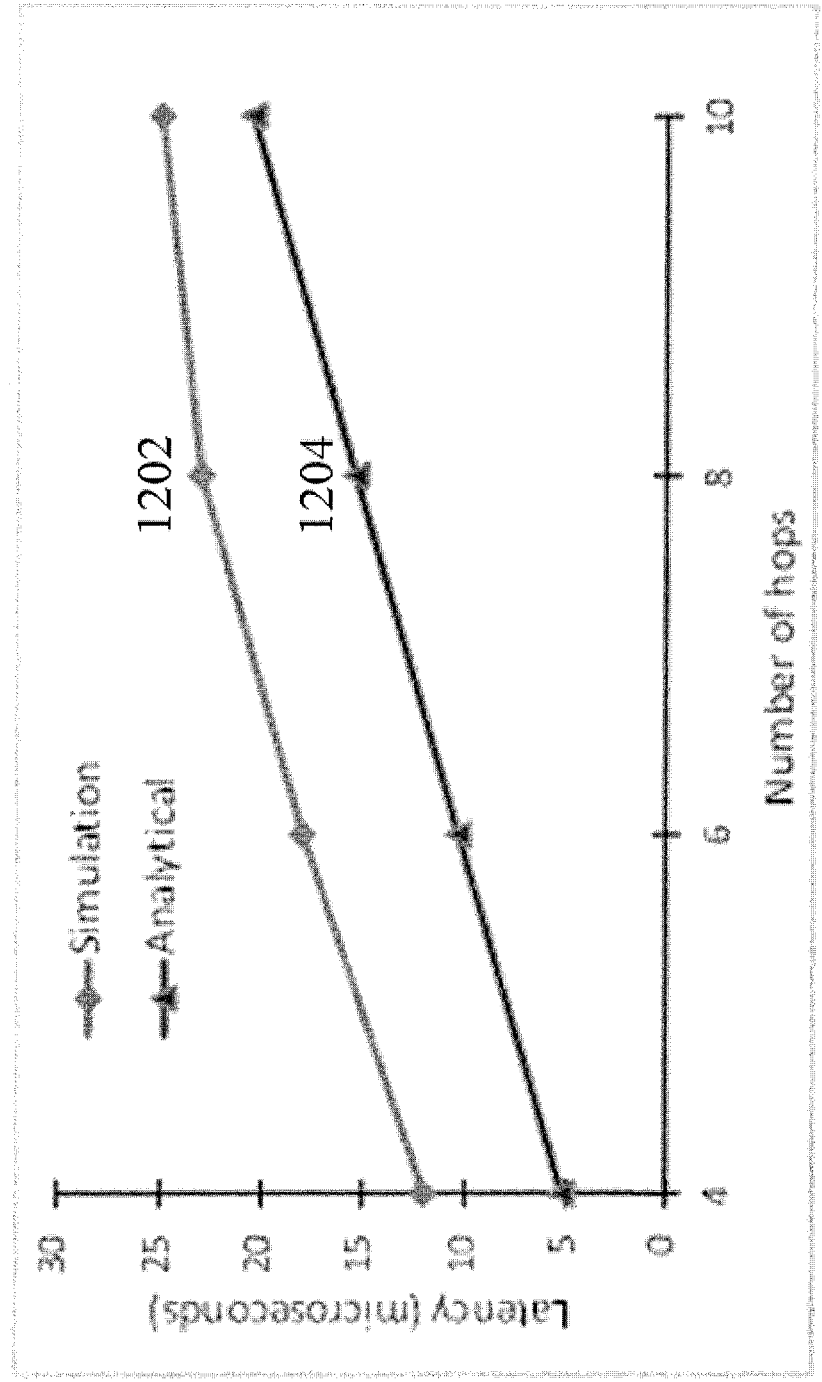
FIG. 12 presents a plot that compares simulation and analytical results in accordance with some embodiments described herein.

FIG. 12 presents a plot that compares simulation and analytical results in accordance with some embodiments described herein. In FIG. 12, the curve 1202 corresponds to a simulation result and curve 1204 corresponds to an analytical result. Specifically, FIG. 12 shows a comparison of the analytical result developed above and simulation results described in the following paragraphs. The analytical and simulation results converge for larger sized networks, though for more practical metro type networks, there is a 30% average error due to dynamic traffic and variation in packet size which is not considered in the analytical model. The simulation model assumes the same parameters for network, load and traffic as shown in the optimization evaluation.

Prototype and Evaluation

Figure 13A:
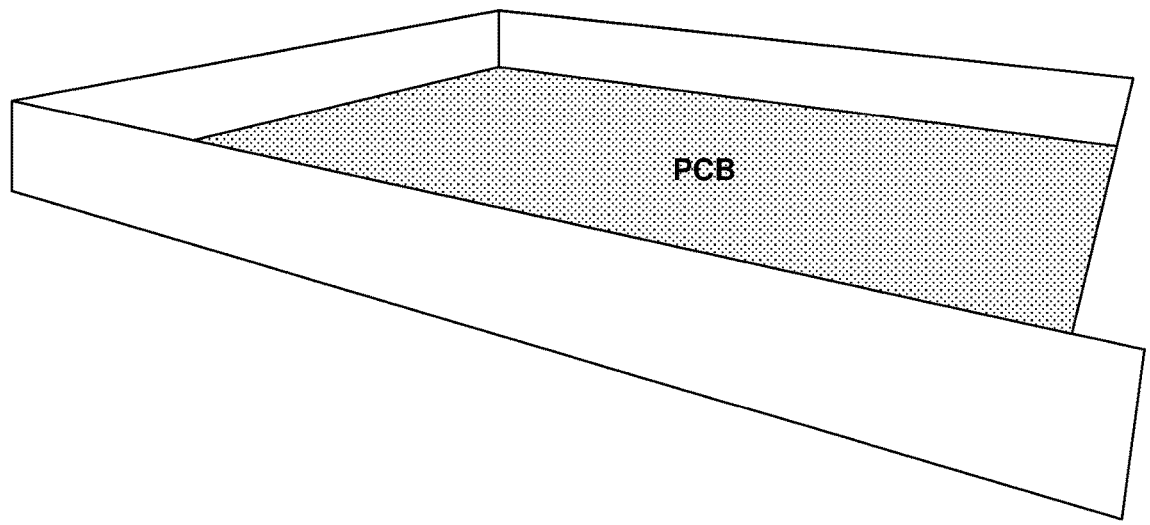
FIG. 13A illustrates two variants of bitstream hardware prototype in accordance with some embodiments described herein.
Figure 13A:
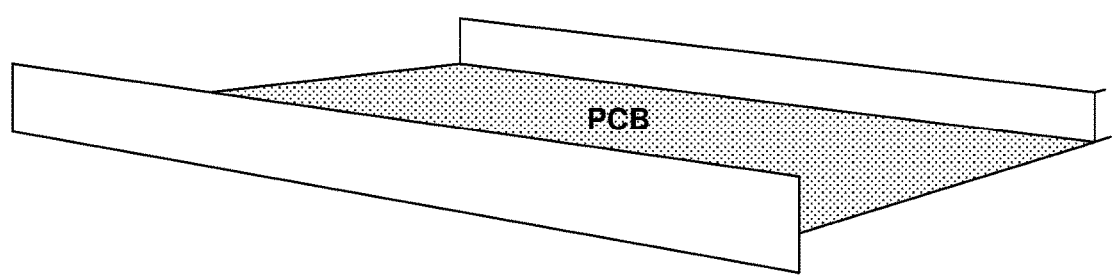

In some of the embodiments described herein, a bitstream capable 400 Gbps hardware prototype is built as shown in FIG. 13A using a 20-layer fabricated PCB (printed circuit board) that encompasses two Xilinx Virtex-7 690T-2 FPGAs along with peripheral memories (QDR, TCAM) and a Framer/Mapper chip. The bitstream protocol is coded in VHDL. Further, because of the large spectrum of protocols supported by bitstream hardware—more than any other off-the-shelf controller, we developed a JAVA-based SDN controller to manage the bitstream network. The controller can be connected to other controllers using a REST API.

Figure 13B:
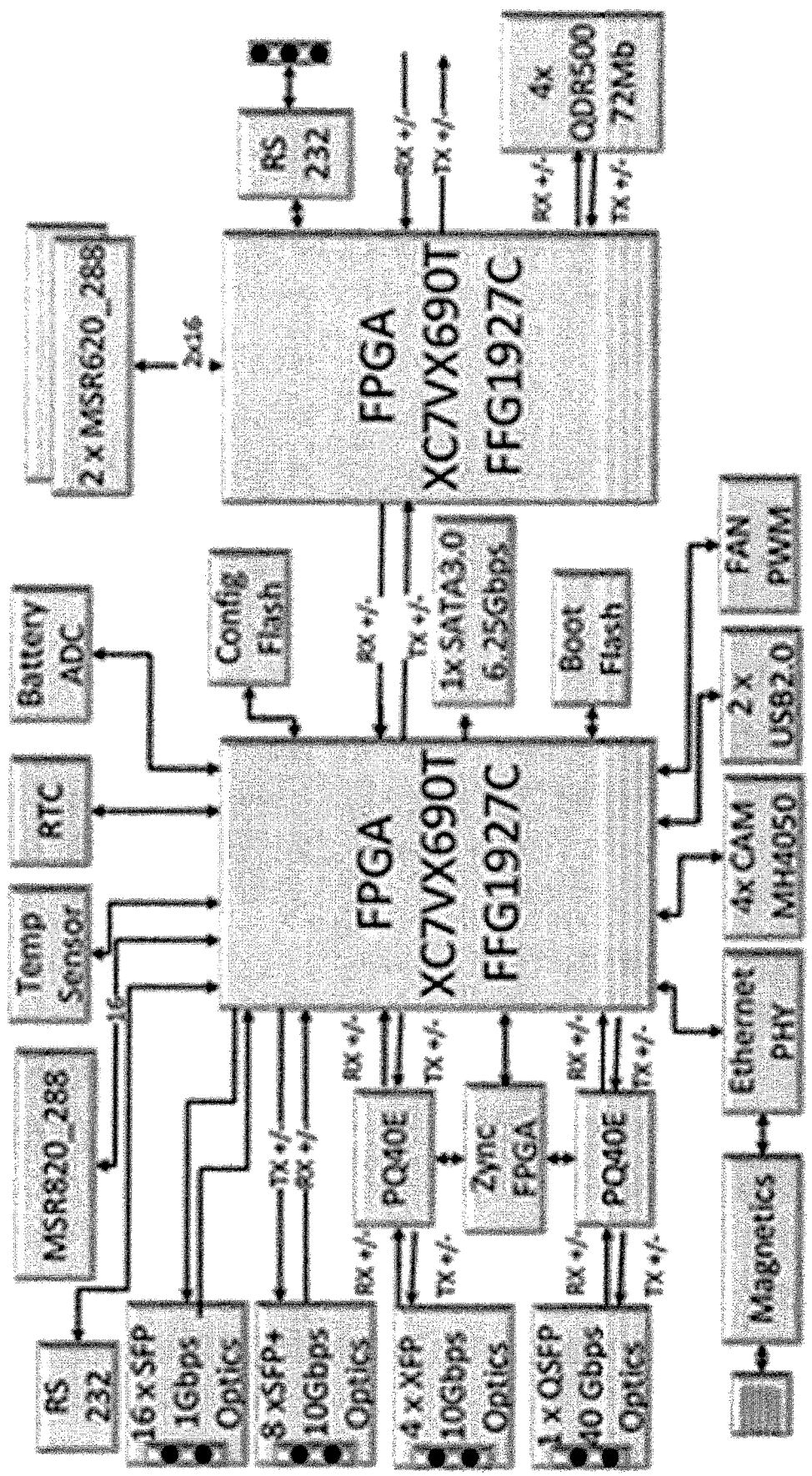
FIG. 13B illustrates a block diagram in accordance with some embodiments described herein.

FIG. 13B illustrates a PCB schematic and block diagram in accordance with some embodiments described herein. At the heart of the hardware are two Xilinx Virtex 7 690T FPGAs. The first FPGA is connected to all the IO ports, while the second FPGA is connected to a passive backplane for scalability. The system can scale to an aggregate 528 Gbps capacity with OTN and 408 Gbps without OTN using three cards as shown in FIG. 14.

Figure 14:
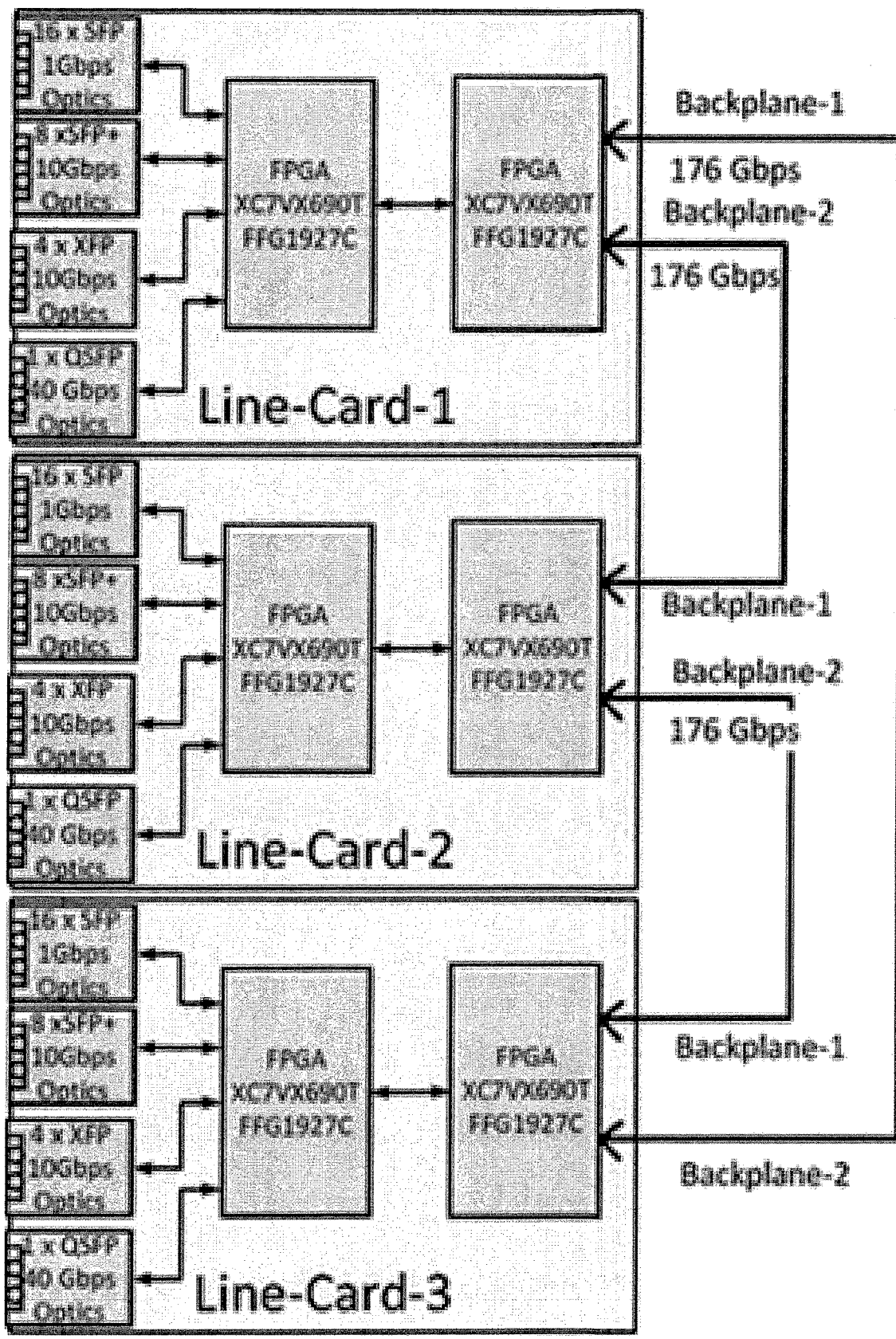
FIG. 14 illustrates 3-card interconnection realizing a 400 Gbps system in accordance with some embodiments described herein.

FIG. 14 illustrates 3-card interconnection realizing a 400 Gbps system in accordance with some embodiments described herein. In each card, the first FPGA is used for parsing and local switching, while the second FPGA is used for action, and further switching. Local memories in the form of block RAMs are instantiated as VOQs in each FPGA. The switch-fabric is developed by cascading multiplexers in the FPGAs. The FPGAs are connected to 4 TCAMs. Each TCAM is 576 Mbit in size. TCAMs store flow table entries written by the SDN controller through a VHDL coded CSM. Packets are stored in both on-chip (Block RAMs) and off-chip large bandwidth QDR memories. The first FPGA is connected to an on-board 32-bit 1 GHz (Arm Cortex 9) processor. Each card has 16×1 Gbps, 8×10 Gbps IOs (SFP+), 4×10 Gbps long-reach capable XFP optics and a 40 Gbps port in addition to a fully non-blocking supporting backplane port that is capable of transmitting 352 Gbps in the backplane. The board also houses PQ40E chips SERDES for communication with the 10 Gbps and 40 Gbps ports. Three boards can be connected through a passive backplane in the arrangement as shown in FIG. 14. In this arrangement, cards 1, 2 and 3 are each of 176 Gbps IO capacity connected to the backplane (which is actually 400 Gbps). The cards can send to the backplane at full IO rate of 176 Gbps.

Figure 15B:
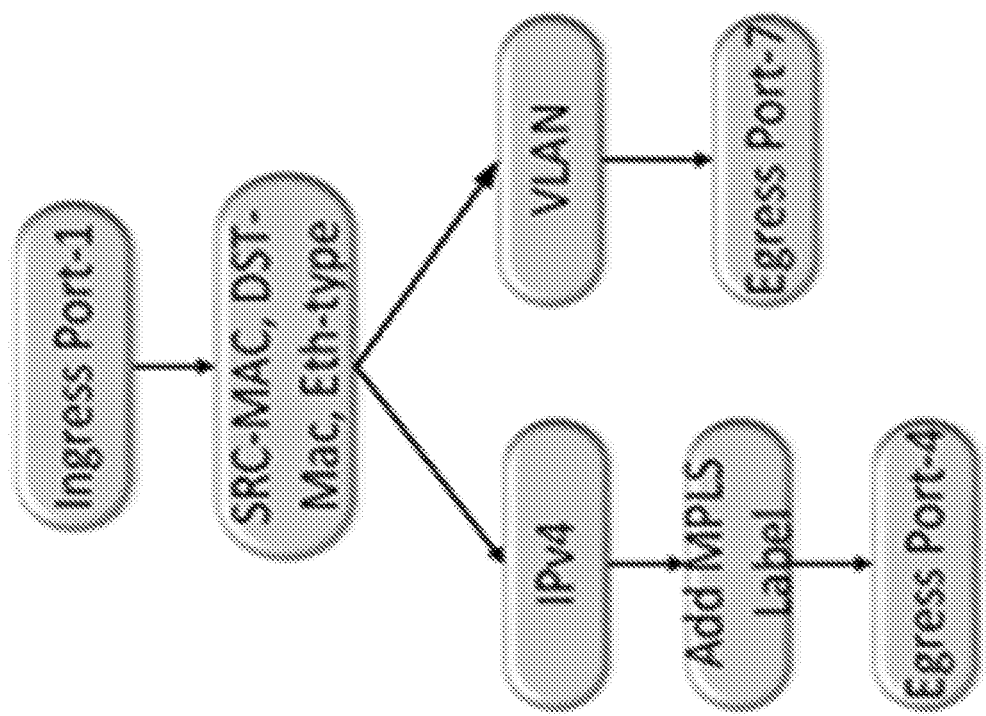
FIG. 15B illustrates a service parse graph in accordance with some embodiments described herein.
Figure 15A:
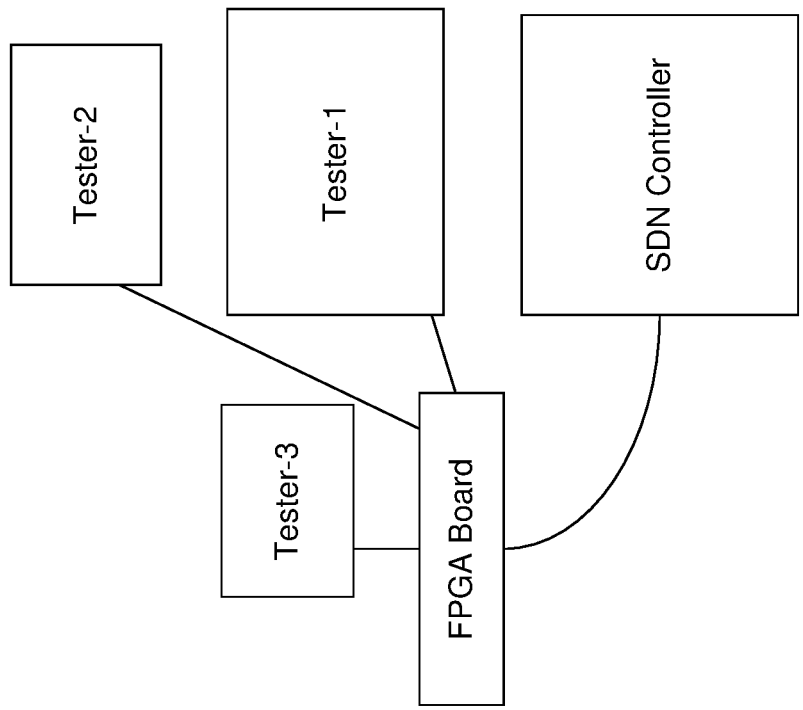
FIG. 15A illustrates an experimental setup in accordance with some embodiments described herein.

FIG. 15A illustrates an experimental setup in accordance with some embodiments described herein. Specifically, for the purpose of testing, a single card test-bed is setup as shown in FIG. 15A. A Viavi ONT-506 (see https.//www.microlease.com/eu/products/viavi-formerly-jdsu-/sdh-sonet-ethernet/ont506?basemodelid=10898#overview) series tester is used for packet generation and reception. Performance of the hardware is evaluated based on the number of clock cycles (each of 6.4 nanoseconds) required to complete an instruction. Performance of different instructions is shown in Table IV. Clock cycles taken by an instruction are dependent on the location of the respective fields in the packet. Each IO port receives 8-bytes of packet in each clock-cycle. To reach an offset of the packet, it takes [offset/8] number of cycles.

TABLE IV

| Operational performance | |
|---|---|
| Instruction | Number of cycles |
| Set field | 4 + offset/8 |
| Mod field | 4 + offset/8 |
| Write | 24 |
| Add field | 4 + offset/8 |
| Delete field | 6 + offset/8 |
| Output | 42 + Len/2 |
| Offset | Field location in the packet |
| Len | Length of the packet in multiples of 8 Bytes |

FIG. 15B illustrates a service parse graph for two flows in accordance with some embodiments described herein. For evaluation, two flows are provisioned. One to add an MPLS label in an IPv4 packet and another flow is set for a VLAN tagged packet and forwards both flows to specific port. The parser extracts the source address, destination address and Ethertype from an incoming packet and matches these in the flow table. If the Ethertype matches to an IPv4 packet, an MPLS label is added into the packet along with the appropriate BS. If the Ethertype matches for a VLAN tagged packet then only the BS is added in the packet. We measured a throughput of 14.2 MPPS where average packet-size is 80B and latency of 1.7 μs for only the MPLS flow.

Figure 16:
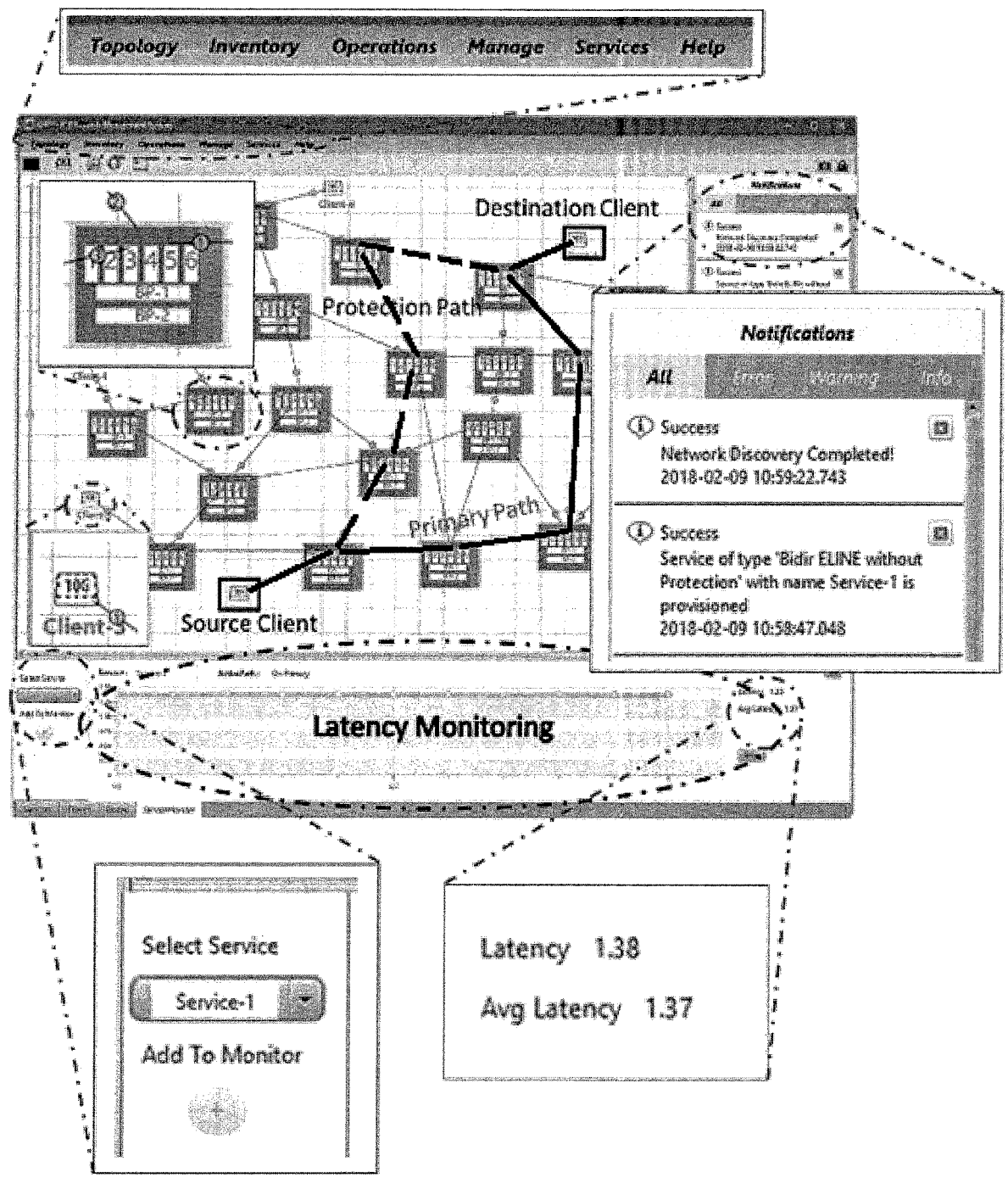
FIG. 16 illustrates a graphical user interface (GUI) for a bitstream snippet (BS) controller in accordance with some embodiments described herein.

FIG. 16 illustrates a GUI for a bitstream snippet (BS) controller in accordance with some embodiments described herein. Specifically, an example of creating a managed layer-2 point-to-point service through the Bitstream GUI is shown in FIG. 16. A MAC based service is requested between client-1 and client-2 (shown as source and destination client nodes in the GUI palette). The controller configures the requested service and displays the provisioned paths in the GUI. The primary path is shown in thick continuous lines and the protection path is shown in thick dashed lines. A real-time latency monitoring for the provisioned service is displayed at the bottom of the Bitstream GUI.

Figure 17:
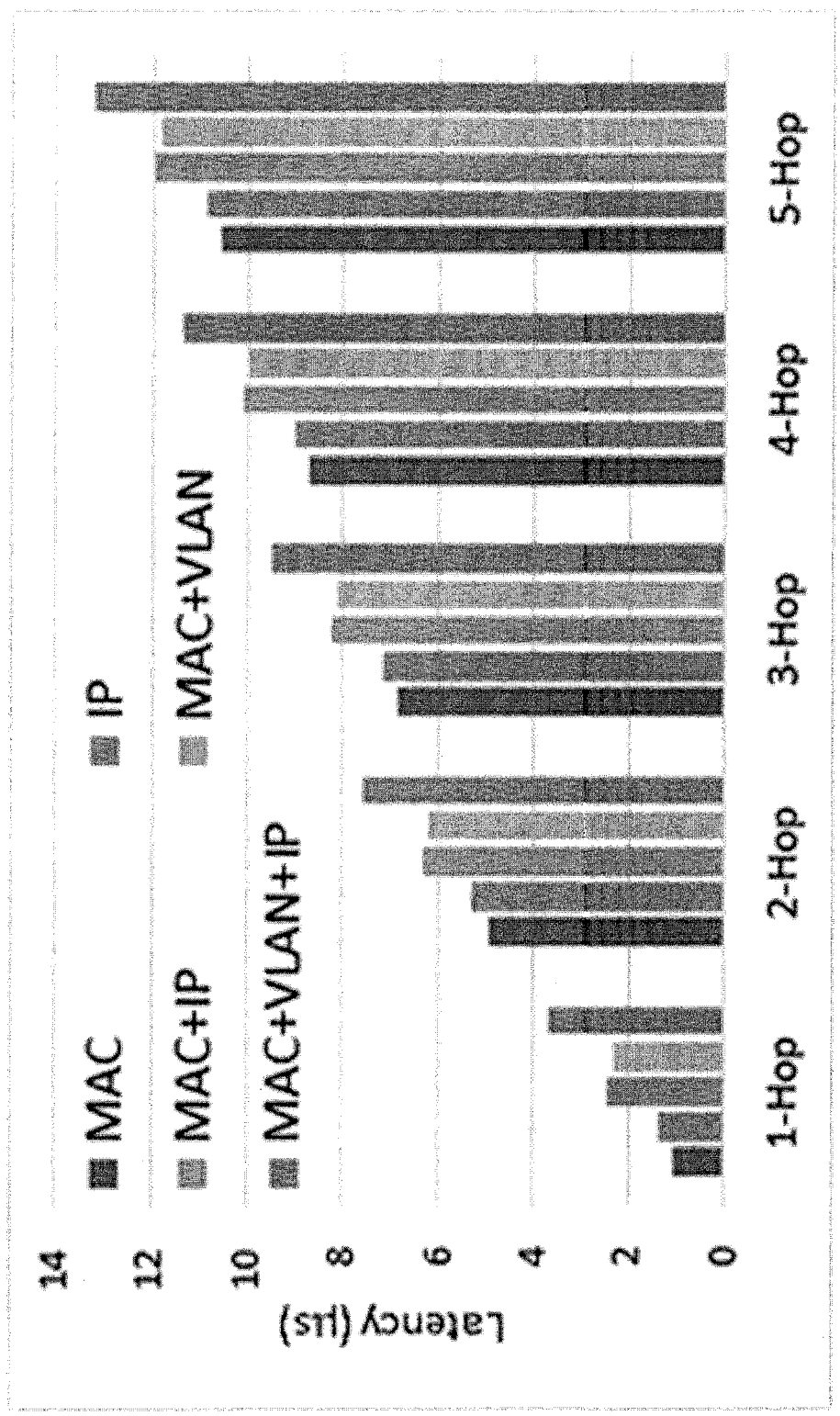
FIG. 17 presents a plot depicting experimental measurement of latency as a function of hop-count for a 1 Gbps service in accordance with some embodiments described herein.

FIG. 17 presents a plot depicting experimental measurement of latency as a function of hop-count for a 1 Gbps service in accordance with some embodiments described herein. Each hop count in FIG. 17 is associated with a group of 5 graphical bars. Each of the bars corresponds to a specific combination of protocols. The first bar from the left corresponds to MAC, the second bar corresponds to IP, third bar correspond to MAC+IP, fourth bar corresponds to MAC+VLAN and the fifth bar corresponds to MAC+VLAN+IP. Specifically, FIG. 17 shows measured latency for the services configured on the bitstream hardware using different combination of protocols as a function of number of hops. FIG. 17 shows stability in the performance of the bitstream hardware with the increase in the hop-count and use of different protocols. The goal of this experiment is to show that the delay across multiple hops is deterministic (linear). It can be observed that in case of a single hop with increase in the protocol stack (number of protocols to be processed), the resulting latency increases linearly with the depth of the protocol stack. This is due to the number of successive lookups in the match-table at the ingress node. With an increase in the number of hops, there is a linear increase in latency but the gradient is significantly lower now due to the source routing feature of the bitstream hardware, which avoids any match-table lookups at the nodes other than the ingress node. This result also supports the previously described analytical model. Note that as compared to FIG. 10-12 the latency values in FIG. 17-20 are lower because of actual measurement.

In order to conserve processing power required for the simulation, the described embodiments consistently round-off values to the nearest 10-microseconds. The decrease in latency for MAC+VLAN service as compared to MAC+IP service is due to the added latency by the parser in extracting the required IP field from the packet. For higher-layer protocol extraction, the parser needs to process more number of bytes for extracting the required protocol identifier. For example, to extract a VLAN identifier, the parser needs to process only the initial 16 bytes of data, as the VLAN is at an offset of 12 bytes, i.e., at byte location #13-16 in the packet. In contrast, for extracting the IP protocol identifier, the parser needs to process up to the 36th byte (byte location #17-36), as the IP header is at an offset of 16 bytes and of length 20 bytes. Hence the time required for MAC+IP is more than the time required for MAC+VLAN.

Figure 18:
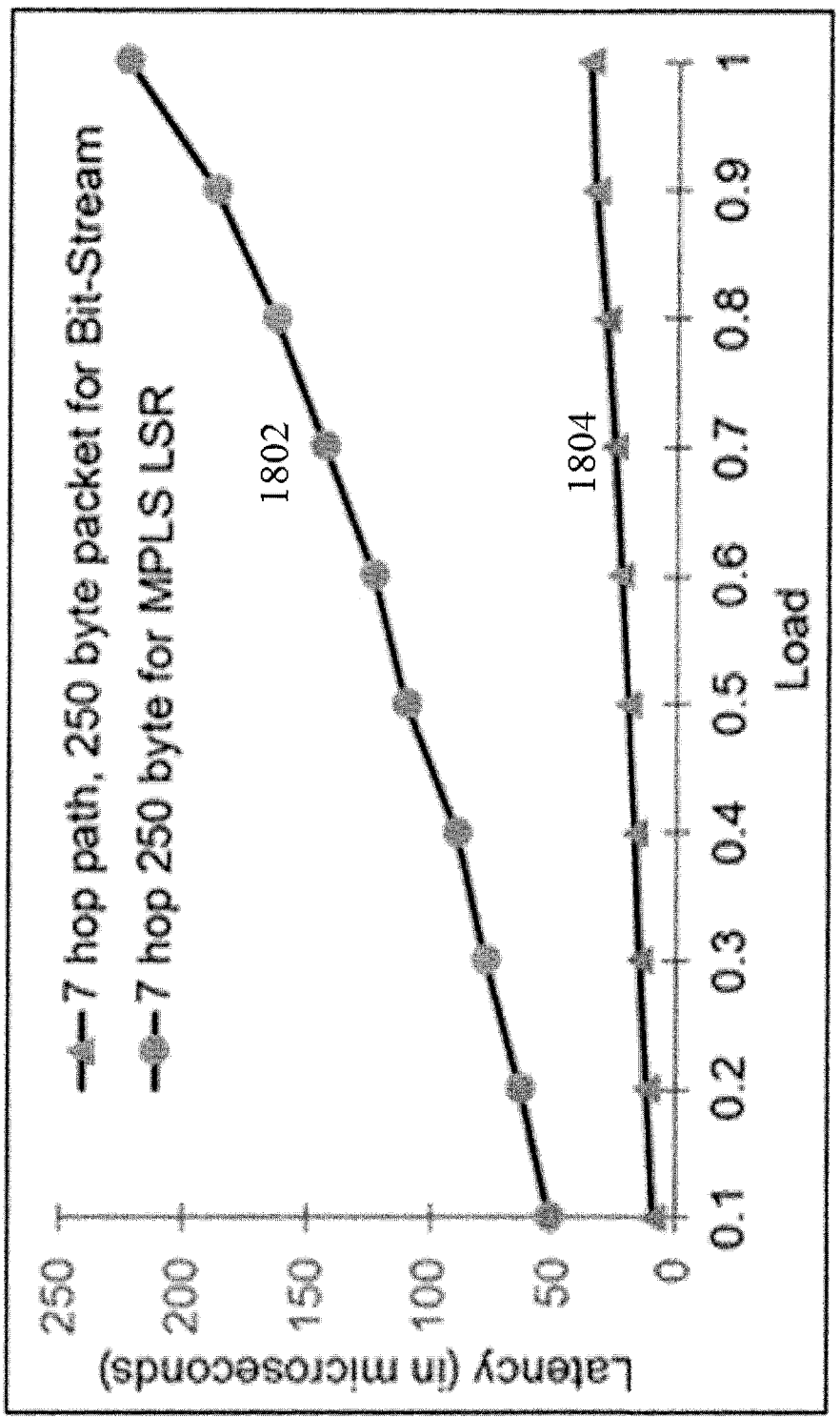
FIG. 18 presents a plot depicting latency as a function of load for BS and MPLS LSR in accordance with some embodiments described herein.

FIG. 18 presents a plot depicting latency as a function of load for BS and MPLS LSR in accordance with some embodiments described herein. The curve 1802 corresponds to MPLS LSR and the curve 1804 corresponds to BS. Specifically, FIG. 18 shows observed latency values for the protocol as compared to an MPLS LSR. A 7-hop path was built for our prototype, as well as for a commercially available MPLS LSR (which was configured as a daisy-chain across multiple ports). To build the 7-hop path, ports of the prototype were connected to one-another in a daisy-chain fashion. Packets of 250-byte average size were injected and QoS level was set to 3. For the bitstream prototype, a VHDL application was developed to measure latency. In case of the commercial LSR, the LSR itself recorded latency. Load was computed as utilization of the data-path. The maximum data-path load was 9.9 Gbps. Note that the average latency in the bitstream case for a 7-hop path is approximately $\frac{1}{6}^{th}$ the latency of the MPLS case. Moreover, due to the carrier-class nature of bitstream, the latency profile is deterministic, whereas it is non-linear for higher-loads in the MPLS case.

Comparison of Bitstream with POF

In some of the embodiments described herein, a POF switch and a bitstream hardware using Modelsim SE 10.4 qqbawfor control and datapath was simulated, assuming similar capabilities and considering that the parser and match-action of both takes the same amount of time. POF as opposed to OF is chosen as a comparative protocol due to its performance betterment (scalability) than OF. Further, we determine control traffic as a measure of how an SDN would work from scalability perspectives.

Figure 19:
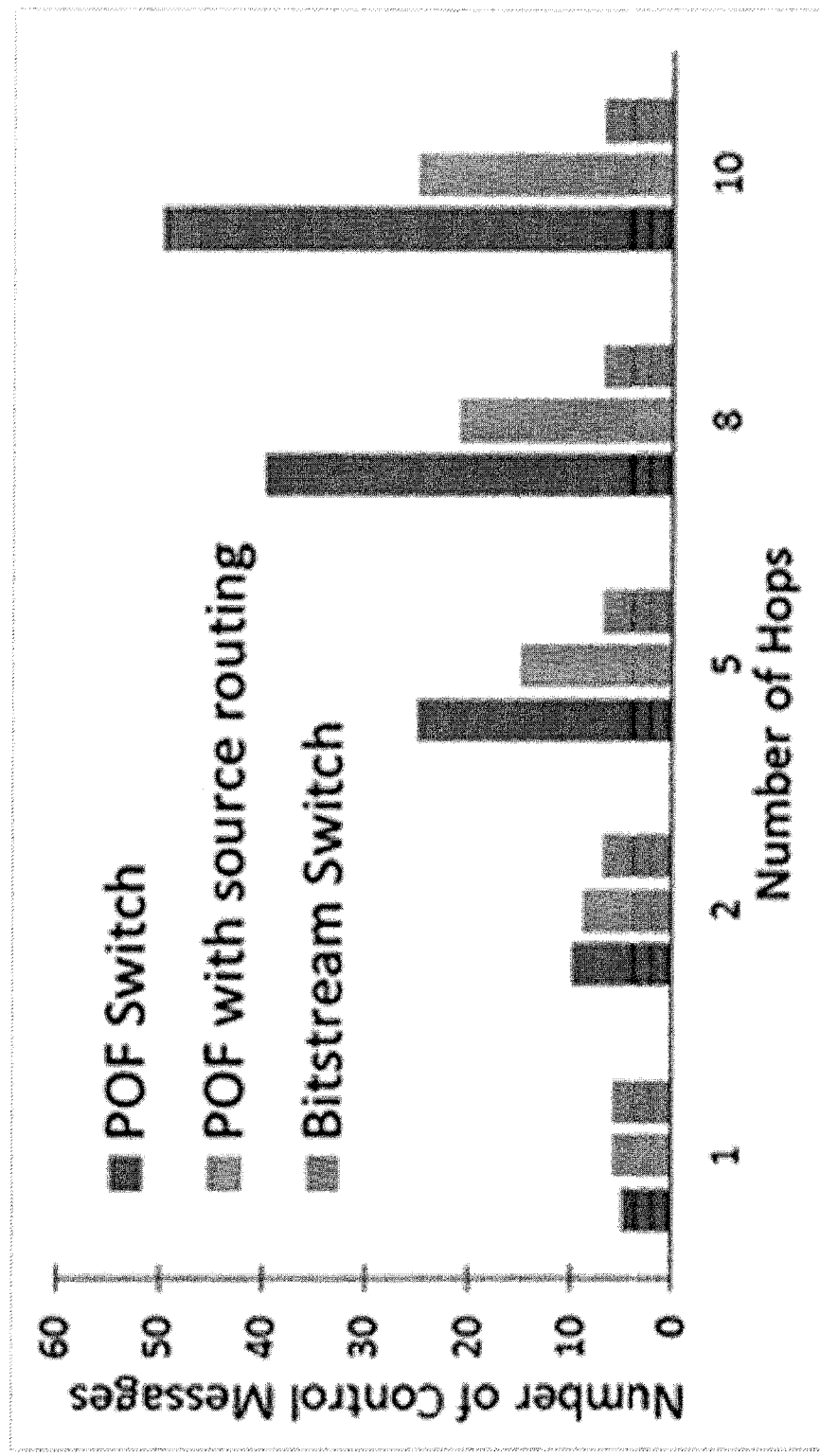
FIG. 19 presents a plot depicting effect of hop length on the control packets in accordance with some embodiments described herein.

In some of the embodiments described herein, a flow similar to the previously described Illustration-1 is set on POF and bitstream switches, which requires multiple stages for packet parsing and match-actions. FIG. 19 presents a plot depicting effect of hop length on the control packets in accordance with some embodiments described herein. Each hop count in FIG. 19 is associated with a group of 3 graphical bars. The first bar from the left corresponds to POF switch, the second bar corresponds to POF with source routing and the third bar corresponds to bitstream switch. Specifically, FIG. 19 shows an evaluation of the number of control packets exchanged between the controller and the switch for the flow setup. For the POF switch, the number of control packets continues to increase with hop length. This increase in the control packet traffic is due to the fact that each node between the source and destination needs to be configured, thereby resulting in control packets being added at each hop. Bitstream uses source routing for packet forwarding and therefore, bitstream switches require configuration only at the ingress switches of a closed domain. As a result, there is no effect of increasing number of hops on control packets. Though a new version of POF can also support source routing (see e.g., S. Li et. al., "Protocol oblivious forwarding (POF): Software-defined networking with enhanced programmability," IEEE Network, Vol. 31, No. 2, pp. 58-66, 2017) by embedding the routing information into a packet with add field action-set, the control traffic reduces only slightly, and is always significantly more compared to bitstream.

Figure 20:
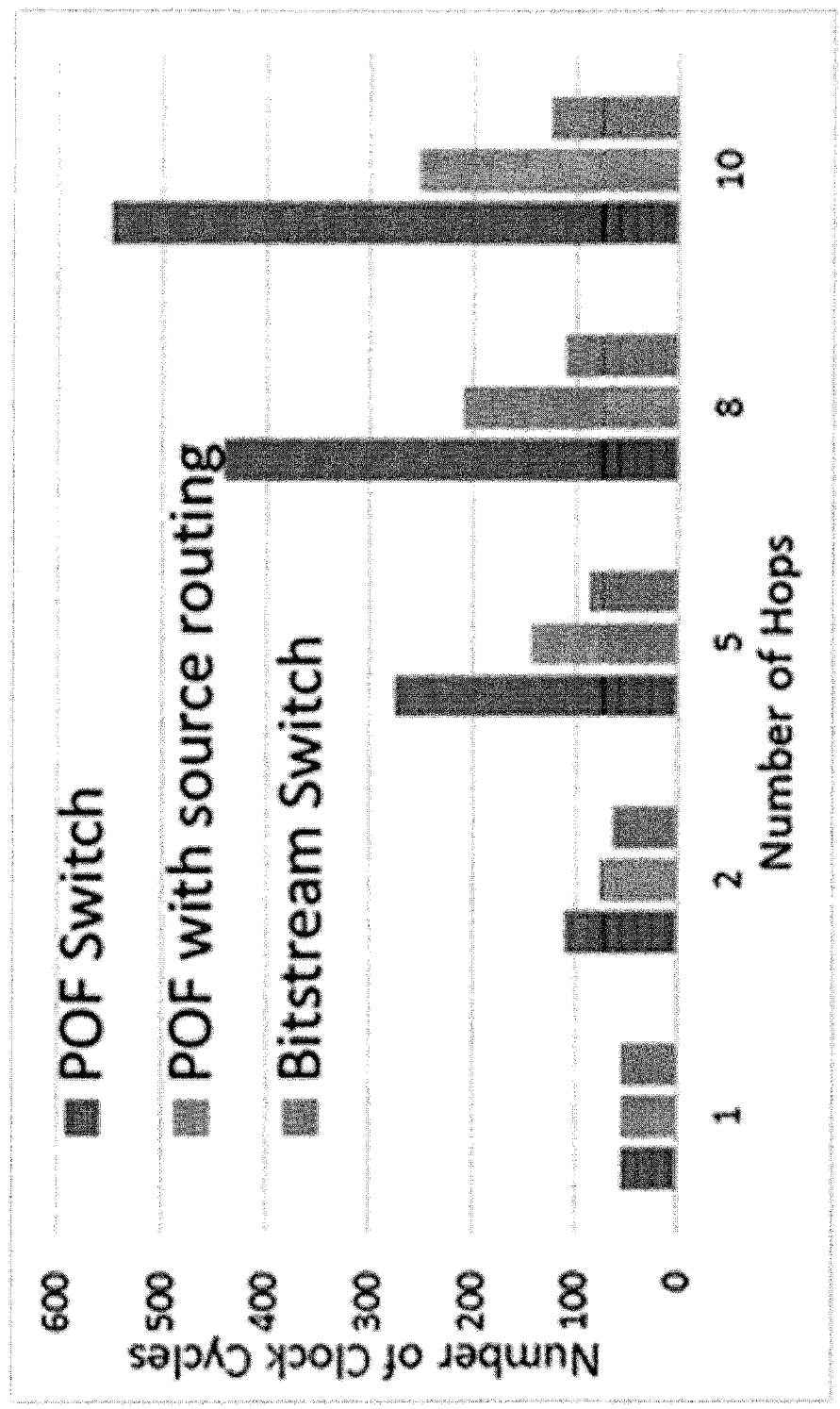
FIG. 20 presents a plot depicting comparison of latency with different number of hops in accordance with some embodiments described herein.

FIG. 20 presents a plot depicting comparison of latency with different number of hops in accordance with some embodiments described herein. Specifically, a comparison of ingress-to-egress latency in terms of number of clock-cycles required by a flow. Each hop count in FIG. 20 is associated with a group of 3 graphical bars. The first bar from the left corresponds to POF switch, the second bar corresponds to POF with source routing and the third bar corresponds to bitstream switch. In case of POF, all switches are configured with flow entries and an ingress packet needs to be parsed and matched at multiple stages of each switch. These multiple stages of parsing and matching keeps adding in clock-cycle count at each switch. It is observed that for a single node, the clock-cycle count is same for POF and bitstream. However, for POF switches (with and without source routing) there is a non-linear increase in clock-cycle count as the number of hops increases. For bitstream, there is a minimal increase in clock-cycle count due to processing of up to $4(\log_2(k)-2)+n$ bits at the intermediate nodes making the protocol ideal for latency sensitive carrier-class applications.

Achieving Service Scalability

OpenFlow 1.5 supports about 40 types of match identifiers on a controller's SBI. These identifiers are matched to tables within an SDN whitebox. The bitstream concept, supports all of the 40-odd match identifiers and also allow the user to define any new protocol match identifier without any change required in the hardware. Table V shows compliance of bitstream with the match identifiers supported by OpenFlow 1.5, while examples of new protocol support have been previously described.

An Example of a YANG Model

The following pseudocode provides an example of the YANG model.

```
module Bitstream-example{
            namespace "http://Bitstream.example.com/";
            prefix "Bitstream";
            import ietf-yang-types {
                prefix "yang";
            }
            include acme-types;
            organization "IIT Bombay "
            contact
                "IIT Bombay ";
            description
                "For Bitstream "
            revision "2017-10-16" {
                description "Initial revision.";
            }
typedef mac_address {
    type string {
       pattern '[0-9a-fA-F]{2}(:[0-9a-fA-F]{2}){5}';
    }
    description "MAC address ";
}
typedef ipv4_address {
    type string {
       pattern
              '(([0-9]|[1-9][0-9]|1[0-9][0-9]|2[0-4][0-9]|25[0-5])\.){3}'
            + '([0-9]|[1-9][0-9]|1[0-9][0-9]|2[0-4][0-9]|25[0-5])'
            + '(%[\p{N}\p{L}]+)?';
    }
    description "IPV4";
}
typedef ipv6_address {
    type string {
       pattern '((:|[0-9a-fA-F]{0,4}):)([0-9a-fA-F]{0,4}:){0,5}'
            + '((([0-9a-fA-F]{0,4}:)?(:|[0-9a-fA-F]{0,4}))|'
            + '(((25[0-5]|2[0-4][0-9]|[01]?[0-9]?[0-9])\.){3}'
            + '(25[0-5]|2[0-4][0-9]|[01]?[0-9]?[0-9])))'
            + '(%[\p{N}\p{L}]+)?';
       pattern '(([^:]+:){6}(([^:]+:[^:]+)|(.*\..*))|'
            + '(((:]+:)*[^:]+)?::(([^:]+:)*[^:]+)?)'
            + '(%.+)?';
    }
    description "IPV6";
}
typedef NetworkFowordingGraph {
    type string{
            pattern"[0-1]*" ;
    }    description "NFG for a node";
}
container Service{
    description "Service "
    container ELINE {
            container address{
                    leaf source{
                        type client_address
                    }
                    leaf destination{
                        type client_address
                    }
            }
            container Stats{
                    leaf bandwidth{
                        type uint16;
                        description "bandwidth of service ";
                    }
                    leaf CBS{
                        type uint16;
                        description "CBS level of service ";
                    }
                    leaf QOS{
                        type QOS_Level;
                        description "Quality of service ";
                    }
            }
            container Path{
                container primary_path
                    leaf-list NFG  {
                        type NetworkFowordingGraph ;
                        description "A list of NFG for nodes";
                    }
                container protection_path
                    leaf-list NFG  {
                        type NetworkFowordingGraph ;
                        description "A list of NFG for nodes along the service path ";
                    }
            }
    }
}
```

Bitstream and OF match field compliance

The following table shows the bitstream and OF match field compliance.

| OF 1.5.1 Match Field Type | Bitstream matching identifier |
| --- | --- |
| OFPXMT_OFB_IN_PORT | Infress logical port |
| OFPXMT_OFB_IN_PHY_PORT | Ingress physical port |
| OFPXMT_OFB_METADATA | Metadata are processed and matched based on table flag |
| OFPXMT_OFB_ETH_DST | Extracted in stage-1 parser (extraction is programmable by controller) |
| OFPXMT_OFB_ETH_SRC | Extracted in stage-1 parser (extraction is programmable by controller) |
| OFPXMT_OFB_ETH_TYPE | Extracted in stage-1 parser (extraction, is programmable by controller) |
| OFPXMT_OFB_VLAN_VID | Extracted by parser programmed by SDN or in later stages based on received OLI value against eth_type=0x8100 |
| OFPXMT_OFB_VLAN_PCP | Extracted by parser in 2nd or later stage based on OLI value received against eth_type=0x8100 |

-continued

| OF 1.5.1 Match Field Type | Bitstream matching identifier |
|---|---|
| OFPXNT_OFB_IP_DSCP | Extracted by parser in 2nd or later stage based on OLI value received against eth_type=0x0800 |
| OFPXMT_OFB_IP_ECN | Extracted by parser in 2nd or later stage based on OLI value received against eth_type=0x0800 |
| OFPXMT_OFB_IP_PROTO | Extracted by parser in 2nd or later stage based on OBI value received against eth_type=0x0800 or 0x86dd |
| OFPXMT_OFB_IPV4_SRC | Extracted by parser programmed by SDN or in later stages based on received OLI value against eth_type=0x0800 |
| OFPXMT_OFB_IPV4_DST | Extracted by parser programmed by SDN or in later stages based on received OLI value against eth_type=0x0800 |
| OFPXMT_OFB_TCP_SRC | Extracted by parser 2nd or later stage based on OLI value received against eth_type=0x0800, IP_protocol=0x06 |
| OFPXMT_OFB_TCP_DST | Extracted by parser in 2nd or later stage based on OLI value received against eth_type=0x0800, IP protocol=0x06 |
| OFPXMT_OFB_UDP_SRC | Extracted by parser in 2nd or later stage based on OLI value received against eth_type=0x0800, IP_protocol=0x11 |
| OFPXMT_OFB_UDP_DST | Extracted by parser in 2nd or later stage based on OLI value received against eth_type=0x0800, IP_protocol=0x11 |
| OFPXMT_OFB_SCTP_SRC | Extracted by parser in 2nd or later stage based on OLI value received against eth_type=0x0800, IP_protocol=0x84 |
| OFPXMT_OFB_SCTP_DST | Extracted by parser in 2nd or later stage based on OLI value received against eth_type=0x0800, IP_protocol=0x84 |
| OFPXMT_OFB_ICMPV4_TYPE | Extracted by parser in 2nd or later stage based on OLI value received against eth_type=0x0800, IP_protocol=0x01 |
| OFPXXMT_OFB_ICMPV4_CODE | Extracted by parser in 2nd or later stage based on OLI value received against eth_type=0x0800, IP_protocol=0x01 |
| OFPXMT_OFB_ARP_SPA | Extracted by parser in 2nd or later stage based on OLI value received against eth_type=0x0806 |
| OFPXMT_OFB_ARP_SPA | Extracted by parser in 2nd or later stage based on OLI value received against eth_type=0x0806 |
| OFPXMT_OFB_ARP_TPA | Extracted by parser in 2nd or later stage based on OLI value received against eth_type=0x0806 |

-continued

| OF 1.5.1 Match Field Type | Bitstream matching identifier |
|---|---|
| OFPXMT_OFB_ARP_SHA | Extracted by parser in 2nd or later stage based on OLI value received against eth_type=0x0806 |
| OXPXMT_OFB_ARP_THA | Extracted by parser in 2nd or later stage based on OLI value received against eth_type=0x0806 |
| OFPXMT_OFB_IPV6_SRC | Extracted by parser programmed by SDN or in later stages based on received OLI value against eth_type=0x86dd |
| OFPXMT_OFB_IPV6_DST | Extracted by parser programmed by SDN or in later stages based on received OLI value against eth_type=0x86dd |
| OFPXMT_OFB_IPV6_FLABEL | Extracted by parser in 2nd or later stage based on OLI value received against eth_type=0x86dd |
| OFPXMT_OFB_ICMPV6_TYPE | Extracted by parser in 2nd or later stage based on OLI value received against eth_type=0x86dd, Type=58 |
| OFPXMT_OFB_ICMPV6_CODE | Extracted by parser in 2nd or later stage based on OLI value received against eth_type=0x86dd, Type=58 |
| AFPXMT_OFB_IPV6_ND_TARGET | Extracted by parser in 2nd or later stage based on OLI value received against eth_type=0x86dd, Type=0x87 or 0x88 |
| OFPXMT_OFB_IPV6_ND_SLL | Extracted by parser in 2nd or later stage based on OLI value received against eth_type=0x86dd, Type=0x87 |
| OFPXMT_OFB_IPV6_ND_TLL | Extracted by parser in 2nd or later stage based on OLI value received against eth_type=0x86dd, Type=0x88 |
| OFPXMT_OFB_MPLS_LABEL | Extraced by parser in 2nd or later stage based on OLI value received against eth_type=0x8847 or 0x8848 |
| OFPXMT_OFB_MPLS_TC | Extracted by parser in 2nd or later stage based on OLI value received against eth_type=0x8847 or 0x8848 |
| OFPXMT_OFP_MPLS_BOS | Extracted by parser in 2nd or later stage based on OLI value received against eth_type=0x8847 or 0x8848 |
| OFPXMT_OFB_PBB_ISID | Extracted by parser in 2nd or later stage based on OLI value received against eth_type=0x88E7 |
| OFPXMT_OFB_TUNNEL_ID | In form of bitstream snippet |
| OFPXMT_OFB_IPV6_EXTHDR | Extracted by parser in 2nd or later stage based on OLI value received against eth_type=0x86dd |
| OFPXMT_OFB_PBB_UCA | Extracted by parser in 2nd or later stage based on OLI value received against eth_type=0x88E7 |

| OF 1.5.1 Match Field Type | Bitstream matching identifier |
|---|---|
| OFPXMT_OFB_TCP_FLAGS | Extracted by parser in 2nd or later stage based on OLI value received against eth_type=0x0800 or0x86dd, IP_prot=0x06 |
| OFPXMT_OFB_ACTSET_OUTPUT | Output port from bitstream snippet |
| OFPXMT_OFB_PACKET_TYPE | Packet ethertype |

In summary, some of the embodiments described herein, present a bitstream scheme to further open SDN towards data-plane programmability. The bitstream scheme uses source routing as an addition to facilitate scalability to be brought into the SDN domain. The scheme facilitates carrier-class communication that is quintessential for SDN adoption in provider networks. A hardware prototype and a controller that supports YANG modeling are developed that can allow implementation in large networks. The described embodiments show lower and importantly network-topology agnostic latency using bitstream. A comparison of bitstream and another leading SDN protocol POF (which in a limited manner betters OF) is also presented showcasing reduction in control traffic and carrier-class performance. A comparative list of OF and bitstream is developed. The test-bed presents a 400 Gbps white-box.

Various embodiments described herein, may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments described herein. The logic may form part of a computer program product adapted to direct an information-processing device to perform a set of steps disclosed in embodiments described herein. Based on the disclosure and teachings provided herein, a person of ordinary skill in the art will appreciate other ways and/or methods to implement the embodiment described herein.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments are illustrative and not limitative. They are not intended to be exhaustive or to limit the described embodiments to the forms disclosed. In addition, similar principles as described corresponding to latches and/or flops can be applied to other sequential logic circuit elements. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method, comprising:
   receiving a packet at source node in a network, wherein the packet is to be routed from the source node to a destination node in the network;
   computing a network path from the source node to the destination node in the network;
   creating a collection of node forwarding graphs based on the network, wherein each physical network node in the network is represented by a corresponding node forwarding graph (NFG), wherein the NFG comprises a set of 1×2 or 1×1 nodes, wherein each 1×2 node has a single input port and two output ports, wherein each 1×1 node has a single input port and a single output port, and wherein each 1×2 or 1×1 node is traversed based on a single bit in a bitstream snippet;
   determining the bitstream snippet by conjoining bits corresponding to traversing 1×2 or 1×1 nodes in NFGs corresponding to physical network nodes along the network path; and
   routing the packet through the network based on the bitstream snippet.

2. The method of claim 1, wherein the packet comprises a set of fields including: (1) an offset that indicates a location in the packet for extracting, inserting, or modifying a field, (2) a length of the field that is to be extracted, inserted, or modified, and (3) an instruction that specifies whether the field is to be extracted, inserted, or modified.

3. The method of claim 1, further comprising:
   detecting a fault in the network path; and
   routing future packets through a protection network path that avoids the fault in the network.

4. The method of claim 1, wherein routing the packet through the network based on the bitstream snippet comprises providing a set of bitstream snippets to the source node in the network.

5. The method of claim 4, wherein routing the packet through the network based on the bitstream snippet comprises:
   selecting, at the source node, the bitstream snippet from the set of bitstream snippets based at least on the destination node;
   adding, at the source node, the bitstream snippet to the packet; and
   at the source node, forwarding the packet to a next node in the network path based on one or more bits in the bitstream snippet.

6. The method of claim 1, wherein at each node in the network path, the packet is forwarded to a next node based on a distinct portion of the bitstream snippet.

7. A network, comprising:
   a set of nodes configured to route a packet from a source node to a destination node based on a bitstream snippet that is included in the packet; and
   a controller node configured to:
     compute a network path from the source node to the destination node in the network;

create a collection of node forwarding graphs based on the network, wherein each physical network node in the network is represented by a corresponding node forwarding graph (NFG), wherein the NFG comprises a set of 1×2 or 1×1 nodes, wherein each 1×2 node has a single input port and two output ports, wherein each 1×1 node has a single input port and a single output port, and wherein each 1×2 or 1×1 node is traversed based on a single bit in the bitstream snippet; and determine the bitstream snippet by conjoining bits corresponding to traversing 1×2 or 1×1 nodes in NFGs corresponding to physical network nodes along the network path.

8. The network of claim 7, wherein the packet comprises a set of fields including: (1) an offset that indicates a location in the packet for extracting, inserting, or modifying a field, (2) a length of the field that is to be extracted, inserted, or modified, and (3) an instruction that specifies whether the field is to be extracted, inserted, or modified.

9. The network of claim 7, wherein the network routes packet through a protection network path upon detecting a fault on the network path, wherein the protection network path avoids the fault on the network path.

10. The network of claim 7, wherein the controller node is configured to provide a set of bitstream snippets to the source node in the network.

11. The network of claim 7, wherein the source node is configured to:
select the bitstream snippet from the set of bitstream snippets based at least on the destination node;
add the bitstream snippet to the packet; and
forward the packet to a next node in the network path based on one or more bits in the bitstream snippet.

12. The network of claim 7, wherein each node in the set of nodes is configured to forward the packet to a next node based on a distinct portion of the bitstream snippet.

13. An apparatus, comprising:
a processor; and
a non-transitory storage medium storing instructions that, when executed by the processor, cause the processor to perform a method to determine a bitstream snippet for each source-destination pair in a set of source-destination pairs in a network, the method comprising:
computing a network path from a source node in the source-destination pair to a destination node in the source-destination pair;
creating a collection of node forwarding graphs based on the network, wherein each physical network node in the network is represented by a corresponding node forwarding graph (NFG), wherein the NFG comprises a set of 1×2 or 1×1 nodes, wherein each 1×2 node has a single input port and two output ports, wherein each 1×1 node has a single input port and a single output port, and wherein each 1×2 or 1×1 node is traversed based on a single bit in the bitstream snippet; and
determining the bitstream snippet by conjoining bits corresponding to traversing 1×2 or 1×1 nodes in NFGs corresponding to physical network nodes along the network path.

14. The apparatus of claim 13, providing the bitstream snippet to the source node in the network.

15. The apparatus of claim 13, wherein at each node in the network path, a packet is forwarded to a next node based on a distinct portion of the bitstream snippet.

* * * * *